United States Patent
Iwai

(10) Patent No.: US 11,594,992 B2
(45) Date of Patent: Feb. 28, 2023

(54) MOTOR CONTROL DEVICE

(71) Applicant: JTEKT CORPORATION, Osaka (JP)

(72) Inventor: Yuta Iwai, Osaka (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/629,786

(22) PCT Filed: Jul. 9, 2018

(86) PCT No.: PCT/JP2018/025939
§ 371 (c)(1),
(2) Date: Jan. 9, 2020

(87) PCT Pub. No.: WO2019/017231
PCT Pub. Date: Jan. 24, 2019

(65) Prior Publication Data
US 2020/0366230 A1    Nov. 19, 2020

(30) Foreign Application Priority Data
Jul. 19, 2017 (JP) .............................. JP2017-140127

(51) Int. Cl.
*H02P 25/098* (2016.01)
*H02P 25/08* (2016.01)
(Continued)

(52) U.S. Cl.
CPC .......... *H02P 25/098* (2016.02); *B62D 5/0463* (2013.01); *B62D 5/0484* (2013.01);
(Continued)

(58) Field of Classification Search
USPC .................................................. 318/400.23
See application file for complete search history.

(56) References Cited

U.S. PATENT DOCUMENTS 5,508,923 A * 4/1996 Ibamoto ................ F02D 11/105
  701/70
2008/0197798 A1 * 8/2008 Yamada ................... H02P 8/22
  318/696
(Continued)

FOREIGN PATENT DOCUMENTS

EP    1 748 550 A1   1/2007
JP    2012-55032 A   3/2012
(Continued)

OTHER PUBLICATIONS

Aug. 28, 2018 International Search Report issued in International Patent Application No. PCT/JP2018/025939.
(Continued)

*Primary Examiner* — Jorge L Carrasquillo
(74) *Attorney, Agent, or Firm* — Oliff PLC

(57) ABSTRACT

A motor control device includes a table in which a motor torque generated from a reluctance torque utilizing motor is stored with respect to a combination of an armature current command value and a current phase angle command value at which the motor torque is maximized for the armature current command value, a first setting portion that sets a motor torque command value that is a command value of a motor torque to be generated by the reluctance torque utilizing motor, and a second setting portion that sets, based on the table, an armature current command value and a current phase angle command value for making a motor torque that is in accordance with the motor torque command value set by the first setting portion be generated from the reluctance torque utilizing motor.

9 Claims, 12 Drawing Sheets

(51) Int. Cl.
*H02P 25/092* (2016.01)
*B62D 5/04* (2006.01)
*H02P 6/16* (2016.01)
*H02P 21/18* (2016.01)
*H02P 21/22* (2016.01)
*H02P 6/10* (2006.01)
*H02P 29/028* (2016.01)

(52) U.S. Cl.
CPC .............. *B62D 5/0487* (2013.01); *H02P 6/10* (2013.01); *H02P 6/16* (2013.01); *H02P 21/18* (2016.02); *H02P 21/22* (2016.02); *H02P 25/0805* (2016.02); *H02P 25/092* (2016.02); *H02P 29/028* (2013.01)

(56) References Cited

U.S. PATENT DOCUMENTS

| | | | | |
|---|---|---|---|---|
| 2012/0046832 | A1* | 2/2012 | Kariatsumari | B62D 5/0463 |
| | | | | 701/41 |
| 2013/0043816 | A1 | 2/2013 | Welchko et al. | |
| 2014/0246999 | A1* | 9/2014 | Kezobo | H02P 25/22 |
| | | | | 318/400.23 |
| 2016/0169755 | A1* | 6/2016 | Shizu | G01L 3/242 |
| | | | | 73/862.192 |
| 2016/0176313 | A1* | 6/2016 | Li | B60L 50/51 |
| | | | | 701/22 |

FOREIGN PATENT DOCUMENTS

| | | | | |
|---|---|---|---|---|
| JP | 2012055032 | A | * | 3/2012 |
| JP | 2014023375 | A | * | 2/2014 |
| JP | 2014-176135 | A | | 9/2014 |
| JP | 2014176135 | A | * | 9/2014 |
| JP | 2015-23635 | A | | 2/2015 |
| WO | 2013/111327 | A1 | | 8/2013 |

OTHER PUBLICATIONS

Masaru Hasegawa et al. "Drive Circuit Technology and Drive Control Technology for Permanent Magnet Motors and Reluctance Motors-6. Reluctance Motor Control Technology—". Proceedings of the 2004 IEE-Japan Industry Applications Society Conference, I-119-I-124 (2004).

Jan. 21, 2020 International Preliminary Report on Patentability issued in International Patent Application No. PCT/JP2018/025939.

Feb. 25, 2021 Extended Search Report issued in European Patent Application No. 18834332.1.

* cited by examiner

FIG. 6

| $\theta$ [deg] <br> $Ia^*$ [Arms], $\beta^*$ [deg] | $\theta_1$ | $\theta_2$ | $\theta_3$ | ... | $\theta_M$ |
|---|---|---|---|---|---|
| $Ia^*_1, \beta^*_1$ | $T_{1,1}$ | $T_{1,2}$ | $T_{1,3}$ | ... | $T_{1,M}$ |
| $Ia^*_2, \beta^*_2$ | $T_{2,1}$ | $T_{2,2}$ | $T_{2,3}$ | ... | $T_{2,M}$ |
| $Ia^*_3, \beta^*_3$ | $T_{3,1}$ | $T_{3,2}$ | $T_{3,3}$ | ... | $T_{3,M}$ |
| ⋮ | ⋮ | ⋮ | ⋮ | ⋮ | ⋮ |
| $Ia^*_N, \beta^*_N$ | $T_{N,1}$ | $T_{N,2}$ | $T_{N,3}$ | ... | $T_{N,M}$ |

| Rotational speed [rpm] | $I_a^*$ [Arms] | $\beta^*$ [deg] |
|---|---|---|
| $\omega 1$ | $I_a^*1$ | $\beta^*1$ |
| $\omega 2$ | $I_a^*2$ | $\beta^*2$ |
| $\omega 3$ | $I_a^*3$ | $\beta^*3$ |
| ⋮ | ⋮ | ⋮ |
| $\omega K$ | $I_a^*K$ | $\beta^*K$ |

FIG. 12

| $I_{a,total}^*$ [Arms], $\beta_{total}^*$ [deg] \ $\theta$ [deg] | $\theta_1$ | $\theta_2$ | $\theta_3$ | $\cdots$ | $\theta_M$ |
|---|---|---|---|---|---|
| $I_{a,total}^*{}_1$, $\beta_{total}^*{}_1$ | $T_{1,1}$ | $T_{1,2}$ | $T_{1,3}$ | $\cdots$ | $T_{1,M}$ |
| $I_{a,total}^*{}_2$, $\beta_{total}^*{}_2$ | $T_{2,1}$ | $T_{2,2}$ | $T_{2,3}$ | $\cdots$ | $T_{2,M}$ |
| $I_{a,total}^*{}_3$, $\beta_{total}^*{}_3$ | $T_{3,1}$ | $T_{3,2}$ | $T_{3,3}$ | $\cdots$ | $T_{3,M}$ |
| $\cdots$ | $\cdots$ | $\cdots$ | $\cdots$ | $\cdots$ | $\cdots$ |
| $I_{a,total}^*{}_N$, $\beta_{total}^*{}_N$ | $T_{N,1}$ | $T_{N,2}$ | $T_{N,3}$ | $\cdots$ | $T_{N,M}$ |

FIG. 14A

| $I_{a1}^{*}$ [Arms], $\beta_1^{*}$ [deg] \ $\theta$ [deg] | $\theta_1$ | $\theta_2$ | $\theta_3$ | $\cdots$ | $\theta_M$ |
|---|---|---|---|---|---|
| $I_{a1}^{*}1, \beta_1^{*}1$ | $T_{1,1}$ | $T_{1,2}$ | $T_{1,3}$ | $\cdots$ | $T_{1,M}$ |
| $I_{a1}^{*}2, \beta_1^{*}2$ | $T_{2,1}$ | $T_{2,2}$ | $T_{2,3}$ | $\cdots$ | $T_{2,M}$ |
| $I_{a1}^{*}3, \beta_1^{*}3$ | $T_{3,1}$ | $T_{3,2}$ | $T_{3,3}$ | $\cdots$ | $T_{3,M}$ |
| $\vdots$ | $\vdots$ | $\vdots$ | $\vdots$ | $\vdots$ | $\vdots$ |
| $I_{a1}^{*}N, \beta_1^{*}N$ | $T_{N,1}$ | $T_{N,2}$ | $T_{N,3}$ | $\cdots$ | $T_{N,M}$ |

FIG. 14B

| $I_{a2}^{*}$ [Arms], $\beta_2^{*}$ [deg] \ $\theta$ [deg] | $\theta_1$ | $\theta_2$ | $\theta_3$ | $\cdots$ | $\theta_M$ |
|---|---|---|---|---|---|
| $I_{a2}^{*}1, \beta_2^{*}1$ | $T_{1,1}$ | $T_{1,2}$ | $T_{1,3}$ | $\cdots$ | $T_{1,M}$ |
| $I_{a2}^{*}2, \beta_2^{*}2$ | $T_{2,1}$ | $T_{2,2}$ | $T_{2,3}$ | $\cdots$ | $T_{2,M}$ |
| $I_{a2}^{*}3, \beta_2^{*}3$ | $T_{3,1}$ | $T_{3,2}$ | $T_{3,3}$ | $\cdots$ | $T_{3,M}$ |
| $\vdots$ | $\vdots$ | $\vdots$ | $\vdots$ | $\vdots$ | $\vdots$ |
| $I_{a2}^{*}N, \beta_2^{*}N$ | $T_{N,1}$ | $T_{N,2}$ | $T_{N,3}$ | $\cdots$ | $T_{N,M}$ |

MOTOR CONTROL DEVICE

TECHNICAL FIELD

The present invention relates to a motor control device that controls a motor that utilizes a reluctance torque to rotate a rotor (hereinafter referred to at times as "reluctance torque utilizing motor"). In addition to a reluctance motor that rotates the rotor utilizing just the reluctance torque, reactance torque utilizing motors also include a motor that utilizes the reluctance torque and a magnet torque to rotate the rotor.

BACKGROUND ART

There are known reluctance motors that rotate the rotor utilizing just the reluctance torque. Among reluctance motors are a switched reluctance motor (SRM) with which a stator and the rotor have salient pole portions and a synchronous reluctance motor (SynRM) with which the stator has the same structure as in a brushless motor.

The synchronous reluctance motor has salient pole portions just at the rotor out of the stator and the rotor. With the synchronous reluctance motor, in accordance with the salient pole portions of the rotor, there are a direction of a salient pole portion in which magnetic flux flows readily (hereinafter referred to as the "d-axis direction") and a direction of a non-salient pole portion in which the magnetic flux hardly flows (hereinafter referred to as the "q-axis direction"). The reluctance torque is thus generated due to a difference $(L_d-L_q)$ between an inductance in the d axis direction (hereinafter referred to as the "d-axis inductance $L_d$") and an inductance in the q axis direction (hereinafter referred to as the "q-axis inductance $L_q$"), and the rotor is rotated by the reluctance torque.

FIG. 9 of Patent Literature 1 discloses a method of controlling a synchronous reluctance motor by vector control similar to that of a brushless motor. Specifically, an armature current command value corresponding to a motor torque to be generated in the synchronous reluctance motor and a current phase angle command value that is in accordance with the armature current command value are set. A d-axis current command value and a q-axis current command value are calculated based on the set armature current command value and current phase angle command value. The synchronous reluctance motor is then subject to current feedback control based on the d-axis current command value and the q-axis current command value.

CITATION LIST

Patent Literature

Patent Literature 1: Japanese Patent Application Publication No. 2015-23635

Non-Patent Literature

Non-Patent Literature 1: Masaru Hasegawa (Chubu University), Shinji Doki (Nagoya University), Akiyoshi Satake (Okuma), and Daohong Wang (Gifu University), "Drive Circuit Technology and Drive Control Technology for Permanent Magnet Motors and Reluctance Motors-6. Reluctance Motor Control Technology-," Proceedings of the 2004 IEE-Japan Industry Applications Society Conference, I-119-1-124 (2004)

SUMMARY OF INVENTION

Technical Problem

With the synchronous reluctance motor, even if the armature current command value and the current phase angle command value are held at predetermined values, the motor torque changes when the difference $(L_d-L_q)$ between the d-axis inductance $L_d$ and the q-axis inductance $L_q$ changes (see formula (4) described below). With the synchronous reluctance motor, the difference $(L_d-L_q)$ between the d-axis inductance $L_d$ and the q-axis inductance $L_q$ changes according to armature current value and rotor rotation angle. Therefore, the method of controlling the synchronous reluctance motor described in Patent Literature 1 has a problem that it is difficult to perform efficient torque control.

An object of the present invention is to provide a motor control device capable of controlling a reluctance torque utilizing motor with high efficiency.

Solution to Problem

A motor control device according to a preferred embodiment of the present invention is a control device (31) that controls a reluctance torque utilizing motor (18) and includes a table (61, 62) in which a motor torque generated from the motor is stored with respect to a combination of an armature current command value and a current phase angle command value at which the motor torque is maximized for the armature current command value, a first setting portion (41) that sets a motor torque command value that is a command value of a motor torque to be generated by the motor, and a second setting portion (42) that sets, based on the table, an armature current command value and a current phase angle command value for making a motor torque that is in accordance with the motor torque command value set by the first setting portion be generated from the motor. Although the alphanumeric characters within the parenthesis represent a corresponding component, etc. in a preferred embodiment to be described below, the scope of the present invention is obviously not restricted to the preferred embodiment. Hereinafter, the same applies in this section.

With the present arrangement, a ratio of the motor torque with respect to an armature current is increased and therefore the synchronous reluctance motor can be driven with high efficiency.

In the preferred embodiment of the present invention, a rotation angle detecting means (25, 53) that detects a rotor rotation angle of the motor is further included, the table is that in which a motor torque generated from the motor is stored according to each rotor rotation angle with respect to a combination of an armature current command value and a current phase angle command value at which the motor torque is maximized for the armature current command value, and the second setting portion sets, based on the table, an armature current command value and a current phase angle command value for making the motor torque that is in accordance with the motor torque command value set by the first setting portion be generated from the motor at the detected rotor rotation angle detected by the rotation angle detecting means.

With the present arrangement, the armature current command value and the current phase angle command value for making the motor torque that is in accordance with the motor torque command value be generated from the electric motor at the detected rotor rotation angle detected by the rotation angle means are set. This makes it possible to suppress torque fluctuation due to the rotor rotation angle.

In the preferred embodiment of the present invention, the table (61, 62) includes a first table (61) in which a motor torque generated from the motor is stored according to each rotor rotation angle with respect to a combination of an armature current command value and a current phase angle command value at which the motor torque is maximized for the armature current command value when the motor is rotated in a first rotation direction and a second table (62) in which a motor torque generated from the motor is stored according to each rotor rotation angle with respect to a combination of an armature current command value and a current phase angle command value at which the motor torque is maximized for the armature current command value when the motor is rotated in a second rotation direction opposite to the first rotation direction. Also, the second setting portion is arranged such that an armature current command value and a current phase angle command value for making the motor torque that is in accordance with the motor torque command value be generated from the motor at the detected rotor rotation angle are set based on the first table when a torque direction of the motor torque command value is the first rotation direction and an armature current command value and a current phase angle command value for making the motor torque that is in accordance with the motor torque command value be generated from the motor at the detected rotor rotation angle are set based on the second table when the torque direction of the motor torque command value is the second rotation direction.

According to the present arrangement, the first table (61) that is applied when the electric motor is rotating in the first rotation direction and the second table (62) that is applied when the electric motor is rotating in the second rotation direction opposite to the first rotation direction are included. Thereby, even if characteristics of the motor torque with respect to the rotor rotation angle differ when the electric motor rotates in the first rotation direction and when the electric motor rotates in the second rotation direction, it becomes possible to appropriately suppress the torque fluctuation due to the rotor rotation angle for each rotation direction.

In the preferred embodiment of the present invention, a torque fluctuation reducing table (60) constituted of the table and a high output table (70) that stores a combination of an armature current command value and a current phase angle command value that enables a maximum motor torque to be obtained according to each rotation speed are provided, and the second setting potion is arranged to select one of either of the torque fluctuation reducing table and the high output table according to the rotation speed of the motor and set an armature current command value and a current phase angle command value using the selected table.

In the preferred embodiment of the present invention, the motor is a reluctance torque utilizing motor that includes two systems of stator coils (18A, 18B). The table is that in which a motor torque generated from the motor is stored with respect to a combination of a comprehensive armature current command value that subsumes the two systems and a current phase angle command value at which the motor torque is maximized for the comprehensive armature current command value. The second setting portion is arranged such that a comprehensive armature current command value set based on the table is distributed between the respective systems. Currents supplied to the stator coils of the respective systems are controlled based on the armature current command values distributed according to the systems and a current phase angle command value set by the second setting portion.

In the preferred embodiment of the present invention, the control device is a control device that controls a reluctance torque utilizing motor that includes two systems of stator coils and further includes a torque command value distributing portion that distributes the motor torque command value set by the first setting portion between a motor torque command value for a first system and a motor torque command value for a second system. The table includes a table for the first system and a table for the second system. The second setting portion includes a first system command value setting portion that uses the table for the first system and the motor torque command value for the first system to set an armature current command value and a current phase angle command value for the first system and a second system command value setting portion that uses the table for the second system and the motor torque command value for the second system to set an armature current command value and a current phase angle command value for the second system. A current supplied to the stator coil of the first system is controlled based on the armature current command value and the current phase angle command value for the first system and a current supplied to the stator coil of the second system is controlled based on the armature current command value and the current phase angle command value for the second system.

In the preferred embodiment of the present invention, the first system command value setting portion is arranged to use a second system abnormal state table that differs from the table for the first system to set the armature current command value and the current phase angle command value for the first system when the second system is abnormal and the second system command value setting portion is arranged to use a first system abnormal state table that differs from the table for the second system to set the armature current command value and the current phase angle command value for the second system when the first system is abnormal.

The aforementioned as well as yet other objects, features, and effects of the present invention will be made clear by the following description of the preferred embodiments made with reference to the accompanying drawings.

BRIEF DESCRIPTION OF DRAWINGS

FIG. 6 is a schematic view of a portion of an example of contents of a forward rotation table.

FIG. 12 is a schematic view of a portion of an example of contents of a forward rotation table included in a comprehensive command value setting table.

FIG. 14A is a schematic view of a portion of an example of contents of a forward rotation table included in a normal state table for a first system.

FIG. 14B is a schematic view of a portion of an example of contents of a forward rotation table included in a normal state table for a second system.

DESCRIPTION OF EMBODIMENTS

Figure 1:
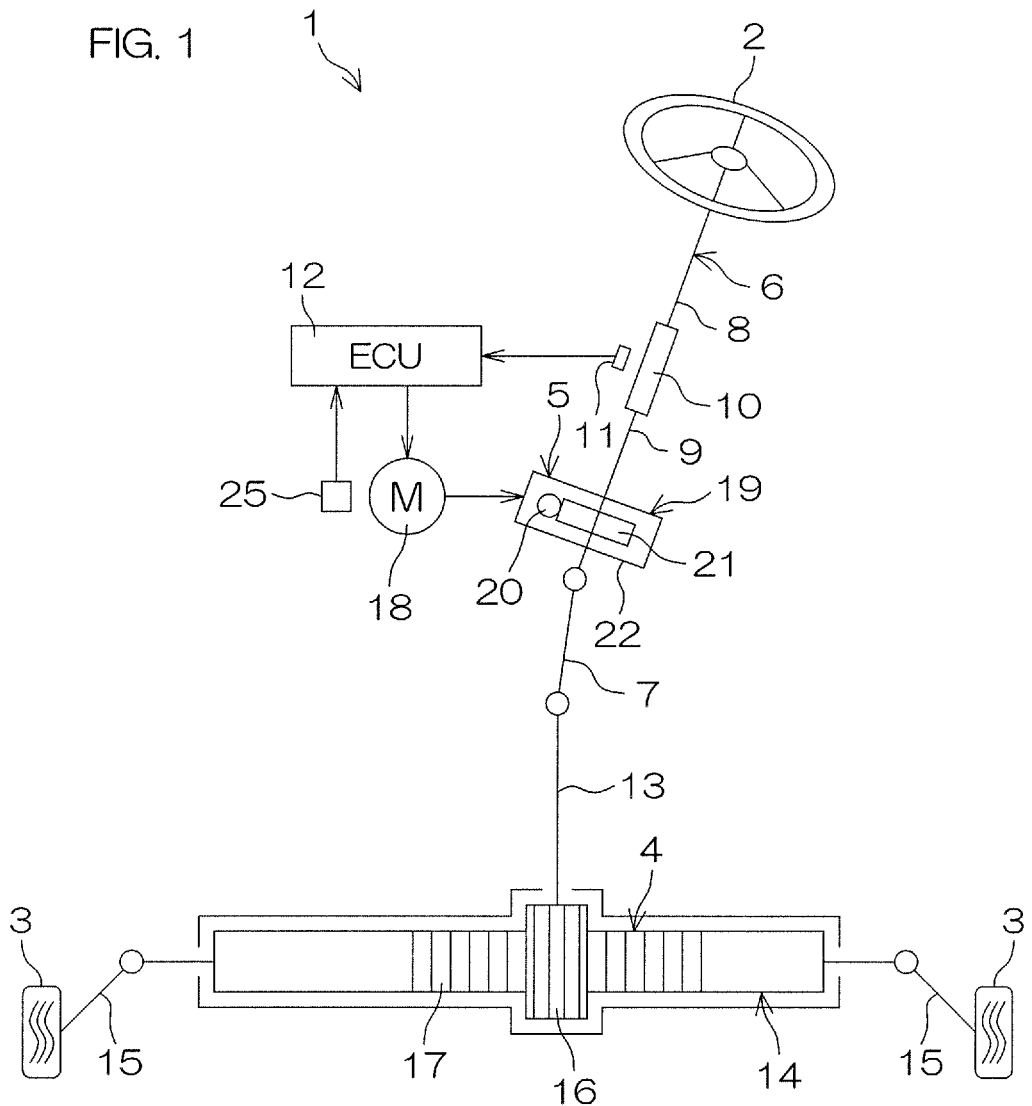
FIG. 1 is a schematic view of the general arrangement of an electric power steering device to which a motor control device according to a preferred embodiment of the present invention is applied.

FIG. 1 is a schematic view of the general arrangement of an electric power steering device to which a motor control device according to a first preferred embodiment of the present invention is applied.

The electric power steering device 1 includes a steering wheel 2 as a steering member arranged to steer a vehicle, a turning mechanism 4 that turns turned wheels 3 in linkage with rotation of the steering wheel 2, and a steering assisting mechanism 5 arranged to assist steering by a driver. The steering wheel 2 and the turning mechanism 4 are mechanically coupled via a steering shaft 6 and an intermediate shaft 7.

The steering shaft 6 includes an input shaft 8 coupled to the steering wheel 2 and an output shaft 9 coupled to the intermediate shaft 7. The input shaft 8 and the output shaft 9 are relatively rotatably coupled via a torsion bar 10.

A torque sensor 11 is provided at a periphery of the steering shaft 6. The torque sensor 11 detects a steering torque $T_h$ applied to the steering wheel 2 based on a relative rotational displacement amount of the input shaft 8 and the output shaft 9. The steering torque $T_h$ detected by the torque sensor 11 is input into an ECU (electronic control unit) 12.

The turning mechanism 4 is constituted of a rack and pinion mechanism that includes a pinion shaft 13 and a rack shaft 14 as a turning shaft. The turned wheels 3 are coupled via tie rods 15 and knuckle arms (not shown) to respective end portions of the rack shaft 14. The pinion shaft 13 is coupled to the intermediate shaft 7. A pinion 16 is coupled to a tip of the pinion shaft 13.

The rack shaft 14 extends rectilinearly along a right/left direction of the vehicle. A rack 17 engaged with the pinion 16 is formed at an intermediate portion in an axial direction of the rack shaft 14. By the pinion 16 and the rack 17, rotation of the pinion shaft 13 is converted to axial direction movement of the rack shaft 14. By moving the rack shaft 14 in the axial direction, the turned wheels 3 can be turned.

When the steering wheel 2 is steered (rotated), the rotation is transmitted to the pinion shaft 13 via the steering shaft 6 and the intermediate shaft 7. The rotation of the pinion shaft 13 is then converted to the axial direction movement of the rack shaft 14 by the pinion 16 and the rack 17. The turned wheels 3 are thereby turned.

The steering assisting mechanism 5 includes an electric motor 18 for steering assistance and a speed reducer 19 arranged to transmit an output torque of the electric motor 18 to the steering mechanism 4. In the present preferred embodiment, the electric motor 18 is constituted of a synchronous reluctance motor. The speed reducer 19 is constituted of a worm gear mechanism that includes a worm gear 20 and a worm wheel 21 engaged with the worm gear 20. The speed reducer 19 is housed inside a gear housing 22.

The worm gear 20 is driven to rotate by the electric motor 18. The worm wheel 21 is integrally rotatably coupled to the steering shaft 6. The worm wheel 21 is driven to rotate by the worm gear 20.

When the worm gear 20 is driven to rotate by the electric motor 18, the worm wheel 21 is driven to rotate and the steering shaft 6 rotates. The rotation of the steering shaft 6 is then transmitted to the pinion shaft 13 via the intermediate shaft 7. The rotation of the pinion shaft 13 is then converted to the axial direction movement of the rack shaft 14 by the rack and pinion mechanism. The turned wheels 3 are thereby turned. That is, the steering assistance by the electric motor 18 is made possible by the worm gear 20 being driven to rotate by the electric motor 18.

A rotation angle of a rotor (hereinafter referred to as the "rotor rotation angle") of the electric motor 18 is detected by a resolver or other rotation angle sensor 25. An output signal of the rotation angle sensor 25 is input into the ECU 12. The electric motor 18 is controlled by the ECU 12 as a motor control device.

Figure 2:
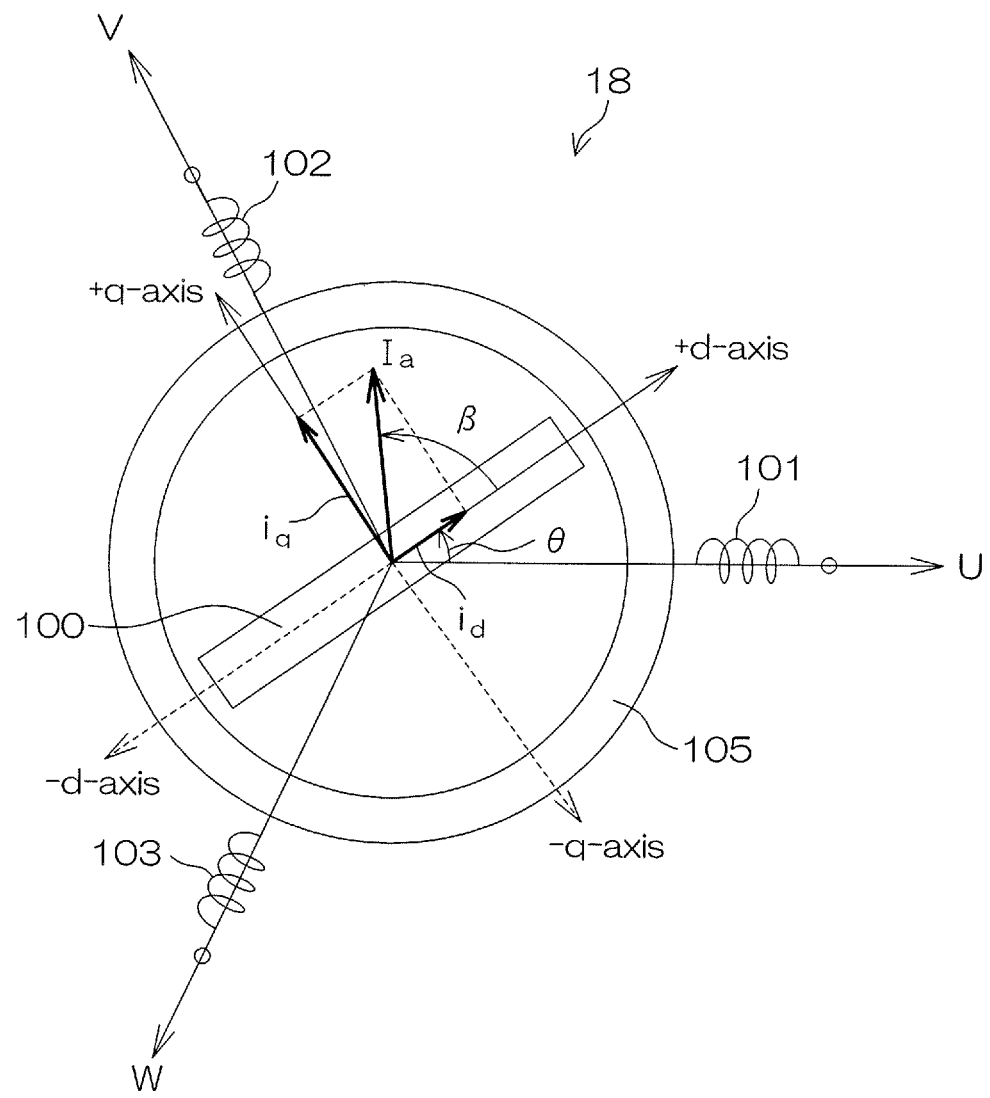
FIG. 2 is an illustrative view for describing the arrangement of an electric motor.

FIG. 2 is an illustrative view for describing the arrangement of the electric motor 18.

As mentioned above, the electric motor 18 is a synchronous reluctance motor and, as shown illustratively in FIG. 2, includes the rotor 100 having a plurality of salient pole portions disposed at intervals in a circumferential direction and a stator 105 having an armature winding. The armature winding is arranged by a U-phase stator coil 101, a V-phase stator coil 102, and a W-phase stator coil 103 being star-connected.

Three-phase fixed coordinates (UVW coordinate system) are defined with a U-axis, a V-axis, and a W-axis set in directions of the stator coils 101, 102, and 103 of the respective phases. Also, a two-phase rotating coordinate system (dq coordinate system, actual rotating coordinate system) is defined with a d-axis direction being set in a direction of a salient pole portion in which a magnetic flux flows readily from a rotational center side to an outer peripheral portion of the rotor 100 and a q-axis direction being set in a direction of a non-salient pole portion in which the magnetic flux hardly flows from the rotational center side to the outer peripheral portion of the rotor 100. The dq coordinate system is an actual rotating coordinate system that is in accordance with the rotation angle (rotor rotation angle) $\theta$ of the rotor 100.

With the present preferred embodiment, the rotor rotation angle (electrical angle) $\theta$ is defined as a counterclockwise rotation angle from the U-axis to one salient pole portion (d-axis) serving as a reference out of two adjacent salient pole portions (d-axis). The direction of the one salient pole portion serving as the reference shall be referred to as the +d-axis direction and the direction of the other salient portion adjacent thereto shall be referred to as the −d-axis direction. An axis rotated by +90 degrees in electrical angle with respect to the +d-axis shall be referred to as the +q-axis, and an axis rotated by −90 degrees in electrical angle with respect to the +d-axis shall be referred to as the −q-axis. Magnetic poles (N pole and S pole) formed in the rotor 100 (salient pole portions) are determined by a direction of a current vector $I_a$ in the dq coordinate system. With the present preferred embodiment, it shall be deemed that a forward rotation direction of the electric motor 18 corresponds to a counterclockwise direction (CCW) of the rotor 100 in FIG. 2 and a reverse rotation direction of the electric motor 18 corresponds to a clockwise direction (CW) of the rotor 100 in FIG. 2.

Coordinate conversion between the UVW coordinate system and the dq coordinate system is performed using the rotor rotation angle θ (see, for example, formulas (1) and (2) of Japanese Patent Application Publication No. 2009-137323).

In the present Specification, a current flowing through the armature winding shall be referred to as the "armature current" or the "motor current." The current vector $I_a$ in the dq coordinate system is a vector of the current flowing through the armature winding (armature current vector). β is a current phase angle and is a phase difference between the armature current vector $I_a$ and the d-axis. $i_d$ is a d-axis current that is expressed by $i_d = I_a \cdot \cos \beta$. $i_q$ is a q-axis current that is expressed by $i_q = I_a \cdot \sin \beta$.

Figure 3:
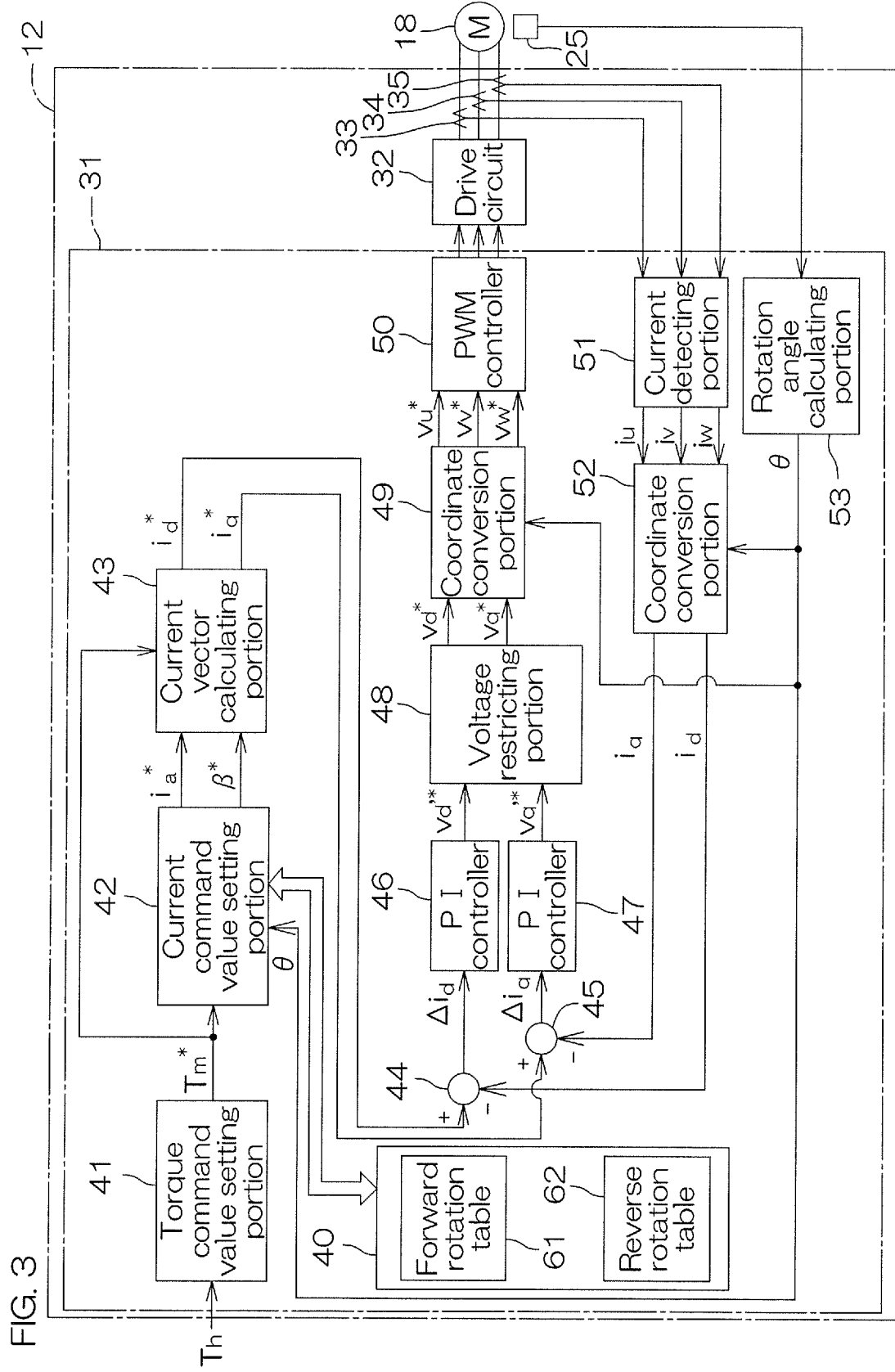
FIG. 3 is an outline view of the electrical arrangement of an ECU of FIG. 1.

FIG. 3 is an outline view of the electrical arrangement of the ECU 12 of FIG. 1.

The ECU 12 includes a microcomputer 31, a drive circuit (inverter circuit) 32 controlled by the microcomputer 31 and supplying power to the electric motor 18, and current sensors 33, 34, and 35 arranged to detect a U-phase current, a V-phase current, and a W-phase current flowing through the electric motor 18.

The microcomputer 31 includes a CPU and a memory and is arranged to function as a plurality of function processing portions by execution of a predetermined program. The memory includes a ROM, a RAM, a nonvolatile memory 40, etc. The plurality of function processing portions include a torque command value setting portion 41, a current command value setting portion 42, a current vector calculating portion 43, a d-axis current deviation calculating portion 44, a q-axis current deviation calculating portion 45, a d-axis PI (proportional/integral) controller 46, a q-axis PI (proportional/integral) controller 47, a voltage restricting portion 48, a two-phase/three-phase coordinate conversion portion 49, a PWM controller 50, a current detecting portion 51, a three-phase/two-phase coordinate conversion portion 52, and a rotation angle calculating portion 53.

The rotation angle calculating portion 53 calculates the rotation angle (rotor rotation angle θ) of the rotor of the electric motor 18 based on the output signal of the rotation angle sensor 25. The rotor rotation angle θ calculated by the rotation angle calculating portion 53 is provided to the current command value setting portion 42 and the coordinate conversion portions 49 and 52.

The current detecting portion 51 detects the phase currents $i_U$, $i_V$, and $i_W$ of the U-phase, the V-phase, and the W-phase (hereinafter referred to as the "three-phase detected currents $i_U$, $i_V$, and $i_W$" when referred to collectively) based on output signals of the current sensors 33, 34, and 35.

Figure 4:
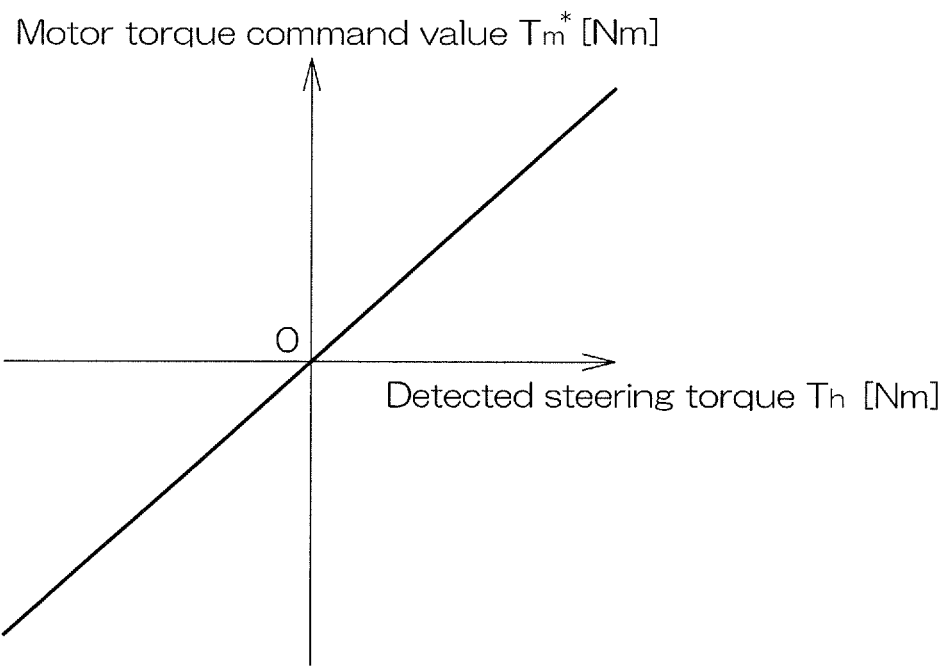
FIG. 4 is a graph of an example of setting a motor torque command value $T_m^*$ with respect to a detected steering torque $T_h$.

The torque command value setting portion 41 sets a motor torque command value $T_m^*$ that is a command value of a motor torque to be generated by the electric motor 18. Specifically, the torque command value setting portion 41 sets the motor torque command value $T_m^*$ based on the steering torque detected by the torque sensor 11 (detected steering torque $T_h$). An example of setting the motor torque command value $T_m^*$ with respect to the detected steering torque $T_h$ is shown in FIG. 4. With the detected steering torque $T_h$, for example, a torque for steering to a left direction takes on a positive value and a torque for steering to a right direction takes on a negative value. A direction of a motor torque of the electric motor 18 for assisting the steering to the left direction corresponds to the forward rotation direction of the electric motor 18, and a direction of a motor torque of the electric motor 18 for assisting the steering to the right direction corresponds to the reverse rotation direction of the electric motor 18. The motor torque command value $T_m^*$ is made a positive value when a steering assisting force for left direction steering is to be generated from the electric motor 18 and is made a negative value when a steering assisting force for right direction steering is to be generated from the electric motor 18.

The motor torque command value $T_m^*$ is positive for a positive value of the detected steering torque $T_h$ and takes on a negative value for a negative value of the detected steering torque $T_h$. When the detected steering torque $T_h$ is zero, the motor torque command value $T_m^*$ is set to zero. An absolute value of the motor torque command value $T_m^*$ is set to a greater value the greater an absolute value of the detected steering torque $T_h$. The steering assisting force can thereby be made the greater the greater the absolute value of the detected steering torque $T_h$.

The torque command value setting portion 41 sets the motor torque command value $T_m^*$ that is in accordance with the steering torque $T_h$ by using a map storing a relationship of the steering torque $T_h$ and the motor torque command value $T_m^*$, for example, as shown in FIG. 4 or a calculation formula expressing the relationship. The motor torque command value $T_m^*$ set by the torque command value setting portion 41 is provided to the current command value setting portion 42 and the current vector calculating portion 43.

An armature current/current phase angle setting table for forward rotation (CCW) (hereinafter referred to as the "forward rotation table 61") and an armature current/current phase angle setting table for reverse rotation (CW) (hereinafter referred to as the "reverse rotation table 62") are stored in the nonvolatile memory 40. Details of the tables 61 and 62 shall be described below.

The current command value setting portion 42 sets an armature current command value $I_a^*$ ($I_a^* > 0$) and a current phase angle command value $\beta^*$ ($\beta^* > 0$) based on the motor torque command value $T_m^*$ provided from the torque command value setting portion 41, the rotor rotation angle θ provided from the rotation angle calculating portion 53, and the table out of the forward rotation and reverse rotation tables 61 and 62 that is in accordance with a torque direction (sign) of the motor torque command value $T_m^*$. Details of the current command value setting portion 42 shall be described below.

The current vector calculating portion 43 calculates a d-axis current command value $i_d^*$ and a q-axis current command value $i_q^*$ based on the armature current command value $I_a^*$ and the current phase angle command value $\beta^*$ set by the current command value setting portion 42 and the sign of the motor torque command value $T_m^*$ provided from the torque command value setting portion 41. Specifically, the current vector calculating portion 43 calculates the d-axis current command value $i_d^*$ based on the following formula (1).

$$i_d^* = I_a^* \cdot \cos \beta^* \quad (1)$$

Also, the current vector calculating portion 43 calculates the q-axis current command value $i_q^*$ based on the following formula (2a) or (2b).

$$\text{If } T_m^* \geq 0: i_q^* = I_a^* \cdot \sin \beta^* \quad (2a)$$

$$\text{If } T_m^* < 0: i_q^* = I_a^* \cdot \sin(-\beta^*) \quad (2b)$$

The d-axis current command value $i_d^*$ and the q-axis current command value $i_q^*$ shall be referred to collectively at times as the "two-phase instruction currents $i_d^*$ and $i_q^*$."

The three-phase detected currents $i_U$, $i_V$, and $i_W$ detected by the current detecting portion 51 are provided to the three-phase/two-phase coordinate conversion portion 52. The three-phase/two-phase coordinate conversion portion 52 uses the rotor rotation angle θ calculated by the rotation angle calculating portion 53 to convert the three-phase detected currents $i_U$, $i_V$, and $i_W$ to a d-axis current value $i_d$ and a q-axis current value $i_q$ (hereinafter referred to as the "two-phase detected currents $i_d$ and $i_q$" when referred to collectively) on the dq coordinates. The d-axis current value $i_d$ obtained by the three-phase/two-phase coordinate conversion portion 52 is provided to the d-axis current deviation calculating portion 44. The q-axis current value $i_q$ obtained by the three-phase/two-phase coordinate conversion portion 52 is provided to the q-axis current deviation calculating portion 45.

The d-axis current deviation calculating portion 44 calculates a deviation $\Delta i_d$ ($=i_d^*-i_d$) of the d-axis current $i_d$ with respect to the d-axis current command value $i_d^*$. The d-axis PI controller 46 performs PI (proportional/integral) calculation on the current deviation $\Delta i_d$ calculated by the d-axis current deviation calculating portion 44 to calculate a d-axis instruction voltage $v_d'^*$. The d-axis instruction voltage $v_d'^*$ is provided to the voltage restricting portion 48.

The q-axis current deviation calculating portion 45 calculates a deviation $\Delta i_q$ ($=i_q^*-i_q$) of the q-axis current $i_q$ with respect to the q-axis current command value $i_q^*$. The q-axis PI controller 47 performs PI (proportional/integral) calculation on the current deviation $\Delta i_q$ calculated by the q-axis current deviation calculating portion 45 to calculate a q-axis instruction voltage $v_q'^*$. The q-axis instruction voltage $v_q'^*$ is provided to the voltage restricting portion 48.

The voltage restricting portion 48 is provided to avoid a state where an induced voltage generated in the electric motor 18 becomes higher than a power supply voltage and current cannot be made to flow through the electric motor 18 (voltage saturation state). The voltage restricting portion 48, for example, restricts the d-axis instruction voltage $v_d'^*$ to not more than a preset d-axis voltage command maximum value and restricts the q-axis instruction voltage $v_q'^*$ to not more than a preset q-axis voltage command maximum value. A d-axis instruction voltage $v_d^*$ and a q-axis instruction voltage $v_q^*$ after the restriction process by the voltage restricting portion 48 are provided to the two-phase/three-phase coordinate conversion portion 49.

The two-phase/three-phase coordinate conversion portion 49 uses the rotor rotation angle θ calculated by the rotation angle calculating portion 53 to convert the d-axis instruction voltage $v_d^*$ and the q-axis instruction voltage $v_q^*$ to instruction voltages $v_U^*$, $v_V^*$, and $v_W^*$ for the U phase, the V phase, and the W phase. The instruction voltages $v_U^*$, $v_V^*$, and $v_W^*$ for the U phase, the V phase, and the W phase shall be referred to as the "the three-phase instruction voltages $v_U^*$, $v_V^*$, and $v_W^*$" when referred to collectively.

The PWM controller 50 generates a U-phase PWM control signal, a V-phase PWM control signal, and a W-phase PWM control signal of duty ratios respectively corresponding to the U-phase instruction voltage $v_U^*$, the V-phase instruction voltage $v_V^*$, and the W-phase instruction voltage $v_W^*$ and supplies the signals to the drive circuit 32.

The drive circuit 32 is constituted of a three-phase inverter circuit corresponding to the U-phase, the V-phase, and the W-phase. By a power element constituting the inverter circuit being controlled by the PWM control signals provided from the PWM controller 50, voltages corresponding to the three-phase instruction voltages $v_U^*$, $v_V^*$, and $v_W^*$ are applied to the stator coils of the respective phases of the electric motor 18.

The current deviation calculating portions 44 and 45 and the PI controllers 46 and 47 constitute a current feedback control means. By action of the current feedback control means, the motor current (armature current) flowing through the electric motor 18 is controlled such that the two-phase instruction currents $i_d^*$ and $i_q^*$ calculated by the current vector calculating portion 43 are approached.

The forward rotation table 61, the reverse rotation table 62, and the current command value setting portion 42 shall now be described in detail.

To drive the electric motor 18 with high efficiency, the electric motor 18 should be controlled such as to increase a ratio of a motor torque with respect to the armature current.

A motor torque $T_m$ of a synchronous reluctance motor with a number of pole pairs being $P_n$ is expressed by the following formula (3).

$$T_m = P_n \cdot (L_d - L_q) \cdot i_d \cdot i_q \tag{3}$$

$L_d$ is the d-axis inductance [H] and $L_q$ is the q-axis inductance [H]. Also, $i_d$ is the d-axis current [A] and $i_q$ is the q-axis current [A].

If the magnitude of the armature current is $I_a$ and the current phase angle is β, $i_q = I_a \cdot \sin β$, $i_d = I_a \cdot \cos β$, and therefore the motor torque $T_m$ is expressed by the following formula (4). The current phase angle β is the phase difference between the armature current vector and the d-axis.

$$T_m = (1/2) \cdot P_n \cdot (L_d - L_q) \cdot I_a^2 \sin 2β \tag{4}$$

Therefore, if the d-axis inductance $L_d$ and the q-axis inductance $L_q$ do not fluctuate, the motor torque $T_m$ is maximized when the current phase angle β is 45 degrees. However, with the synchronous reluctance motor, the d-axis inductance $L_d$ and the q-axis inductance $L_q$ fluctuate due to being influenced by magnetic saturations of the rotor core and the stator core and therefore the motor torque $T_m$ is not necessarily maximized when the current phase angle β is 45 degrees.

Figure 5:
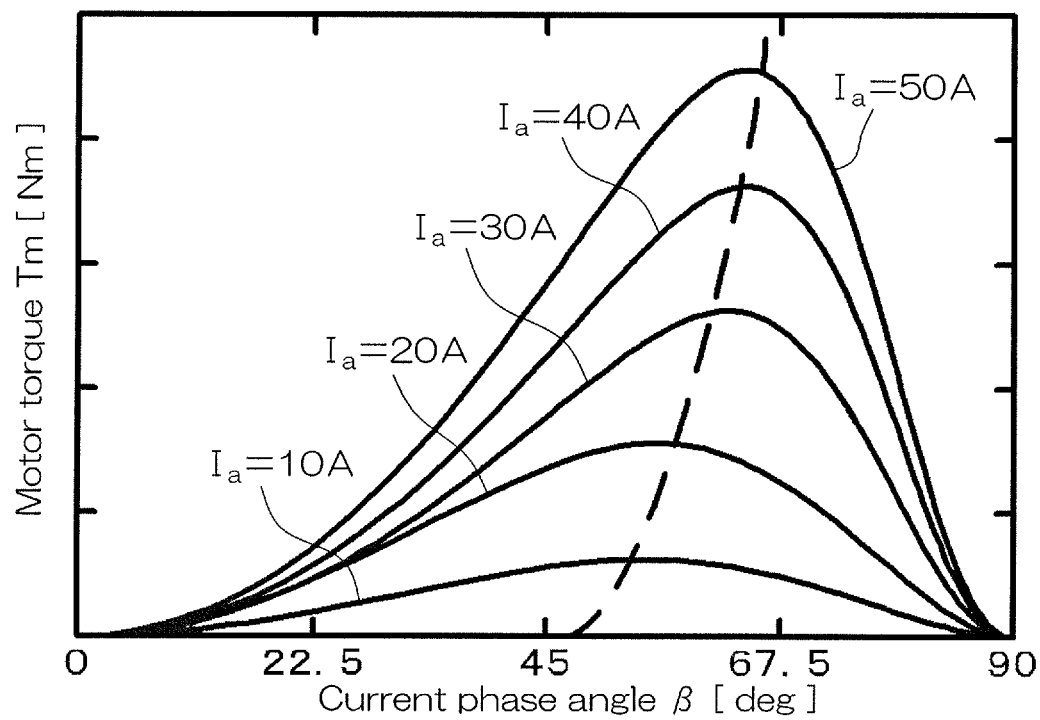
FIG. 5 is a graph of an example of characteristics data of motor torque $T_m$ versus current phase angle $\beta$ acquired for each of a plurality of armature currents $I_a$ with a certain synchronous reluctance motor.

FIG. 5 is a graph of characteristics data of motor torque $T_m$ versus current phase angle β acquired for each of a plurality of armature currents $I_a$ with a certain synchronous reluctance motor. Data published in Non-Patent Literature 1 are appropriated as the characteristics data of FIG. 5. However, in FIG. 5, the current phase angle β is represented on the abscissa, motor torque $T_m$ is represented on the ordinate, and the motor torque $T_m$ versus current phase angle β characteristics at the respective armature currents $I_a$ are respectively expressed by curves.

As shown in FIG. 5, the current phase angle β at which the motor torque $T_m$ is maximized differs according to the magnitude of the armature current $I_a$. With the example of FIG. 5, as the armature current $I_a$ increases, the current phase angle β at which the motor torque $T_m$ is maximized increases. To drive the electric motor 18 with high efficiency, it is preferable to set, as the current phase angle β, the current phase angle β at which the motor torque $T_m$ is maximized for the armature current command value $I_a^*$.

FIG. 6 is a schematic view of a portion of an example of contents of the forward rotation table 61.

In the forward rotation table 61, motor torques $T_m$ [Nm] generated from the electric motor 18 are stored according to each rotor rotation angle θ with respect to combinations of the armature current command value $I_a^*$ and the current phase angle command value β* at which the motor torque $T_m$ is maximized for the armature current command value $I_a^*$ when the electric motor 18 is rotated in the forward rotation direction.

In the present example, N armature current command values $I_a^*$ are in a relationship of $I_{a1}^* < I_{a2}^* < \ldots I_{aN}^*$. M rotor rotation angles $\theta$ are set to be of a predetermined angular increment from 0 deg to 360 deg such as to realize a resolution sufficient to express changes of the motor torque $T_m$. The motor torque $T_m$ is set to increase as the armature current command value $I_a^*$ increases.

Such a forward rotation table 61 is prepared, for example, as follows. When a predetermined armature current command value $I_a^*$ and a predetermined current phase angle command value $\beta^*$ are provided together with a sign representing the forward rotation direction to the current vector calculating portion 43 of a motor control circuit such as shown in FIG. 3, the electric motor 18 is driven to rotate forward based on the two-phase instruction currents $i_d^*$ and $i_q^*$ that are in accordance with the armature current command value $I_a^*$, the current phase angle command value $\beta^*$, and the sign. In the state where the electric motor 18 is being driven to rotate forward, the motor torque $T_m$ generated from the electric motor 18 and the rotor rotation angle $\theta$ are acquired. The motor torque $T_m$ according to each rotor rotation angle $\theta$ is thereby obtained with respect to the combination of the predetermined armature current command value $I_a^*$ and the predetermined current phase angle command value $\beta^*$. Here, the motor torque $T_m$ is measured using a measurement device that is not shown.

By performing such an experiment for each of a plurality of current phase angle command values $\beta^*$, data of the motor torque $T_m$ according to each rotor rotation angle $\theta$ are obtained with respect to respective combinations of the predetermined armature current command value $I_a^*$ and the plurality of current phase angle command values $\beta^*$. Based on the data thus acquired, the current phase angle command value $\beta^*$ at which the motor torque $T_m$ is maximized for the predetermined armature current command value $I_a^*$ is specified.

Such experiments as the above are performed for each of a plurality of armature current command values $I_a^*$ to acquire, for each of the plurality of armature current command values $I_a^*$, data of the motor torque $T_m$ according to each rotor rotation angle $\theta$ with respect to the combination of the armature current command value $I_a^*$ and the current phase angle command value $\beta^*$ at which the motor torque $T_m$ is maximized for the armature current command value $I_a^*$. The data for preparing the forward rotation table 61 are thereby obtained.

Although not illustrated, in the reverse rotation table 62, motor torques $T_m$ [Nm] generated from the electric motor 18 are stored according to each rotor rotation angle $\theta$ with respect to combinations of the armature current command value $I_a^*$ and the current phase angle command value $\beta^*$ at which the motor torque $T_m$ is maximized for the armature current command value $I_a^*$ when the electric motor 18 is rotated in the reverse rotation direction.

The reverse rotation table 62 is prepared by performing experiments similar to the experiments performed to prepare the forward rotation table 61. However, unlike in the case of preparing the forward rotation table 61, a sign representing the reverse rotation direction is provided to the current vector calculating portion 43 during the experiments in preparing the reverse rotation table 62. The electric motor 18 is thereby driven to rotate in the reverse rotation direction during the experiments.

Next, operations of the current command value setting portion 42 shall be described in detail. In the following description, the newest rotor rotation angle $\theta$ calculated by the rotation angle calculating portion 53 shall be referred to as the "present rotor rotation angle $\theta$."

The current command value setting portion 42 first selects, from between the forward rotation table 61 and the reverse rotation table 62, the table 61 or 62 of the rotation direction that is in accordance with the sign of the motor torque command value $T_m^*$. Then based on the selected table 61 or 62, the current command value setting portion 42 sets the armature current command value $I_a^*$ and the current phase angle command value $\beta^*$ for making a motor torque that is in accordance with the motor torque command value $T_m^*$ be generated from the electric motor 18 at the present rotor rotation angle $\theta$.

Specifically, the current command value setting portion 42 searches the plurality of motor torques $T_m$ corresponding to the present rotor rotation angle $\theta$ in the selected table 61 or 62 for a motor torque $T_m$ of the same magnitude as the motor torque command value $T_m^*$. If the motor torque $T_m$ of the same magnitude as the motor torque command value $T_m^*$ could be found, the current command value setting portion 42 reads, from the table 61 or 62, the armature current command value $I_a^*$ and the current phase angle command value $\beta^*$ corresponding to the motor torque $T_m$ and sets the command values in the current vector calculating portion 43.

On the other hand, if the motor torque $T_m$ of the same magnitude as the motor torque command value $T_m^*$ could not be found, the current command value setting portion 42 performs a process such as the following. The current command value setting portion 42 reads the armature current command value $I_a^*$ and the current phase angle command value $\beta^*$ corresponding to a motor torque $T_m$, among the plurality of motor torques $T_m$ corresponding to the present rotor rotation angle $\theta$ in the selected table 61 or 62, that is of the closest magnitude less than the motor torque command value $T_m^*$ (hereinafter referred to as the "first motor torque $T_m1$"). Also, the current command value setting portion 42 reads the armature current command value $I_a^*$ and the current phase angle command value $\beta^*$ corresponding to a motor torque $T_m$, among the plurality of motor torques $T_m$ corresponding to the present rotor rotation angle $\theta$ in the selected table 61 or 62, that is of the closest magnitude greater than the motor torque command value $T_m^*$ (hereinafter referred to as the "second motor torque $T_m2$"). The current command value setting portion 42 then performs linear interpolation on the two sets of the armature current command value $I_a^*$ and the current phase angle command value $\beta^*$ that have been read to calculate the armature current command value $I_a^*$ and the current phase angle command value $\beta^*$ corresponding to the motor torque command value $T_m^*$.

The linear interpolation shall now be described specifically. The armature current command value $I_a^*$ and the current phase angle command value $\beta^*$ corresponding to the first motor torque $T_m1$ shall be represented by $I_a^*1$ and $\beta^*1$, respectively, and the armature current command value $I_a^*$ and the current phase angle command value $\beta^*$ corresponding to the second motor torque $T_m2$ shall be represented by $I_a^*2$ and $\beta^*2$, respectively. It shall also be deemed that $T_m2 - T_m1 = \Delta T_m$, that $I_a^*2 - I_a^*1 = \Delta I_a^*$, and that $\beta^*2 - \beta^*1 = \Delta\beta^*$.

The current command value setting portion 42 calculates the armature current command value $I_a^*$ and the current phase angle command value $\beta^*$ corresponding to the motor torque command value $T_m^*$ based on the following formulas (5) and (6). The current command value setting portion 42 then sets the obtained armature current command value $I_a^*$ and current phase angle command value $\beta^*$ in the current vector calculating portion 43.

$$I_a^* = (\Delta I_a^*/\Delta T_m) \cdot (T_m^* - T_m 1) + I_a^* 1 \tag{5}$$

$$\beta = (\Delta \beta^*/\Delta T_m) \cdot (T_m^* - T_m 1) \beta^* 1 \tag{6}$$

With the preferred embodiment described above, the armature current command value $I_a^*$ and the current phase angle command value $\beta^*$ that are optimal for making the motor torque that is in accordance with the motor torque command value $T_m^*$ be generated from the electric motor 18 at the rotor rotation angle θ provided from the rotation angle calculating portion 53 can be set. It thereby becomes possible to suppress torque fluctuation due to the rotor rotation angle θ.

Also, according to the preferred embodiment described above, the forward rotation table 61 that is applied when the electric motor 18 is rotating in the forward rotation direction and the reverse rotation table 62 that is applied when the electric motor 18 is rotating in the forward rotation direction are included. Thereby, even if characteristics of the motor torque $T_m$ with respect to the rotor rotation angle θ differ when the electric motor 18 rotates in the forward rotation direction and when the electric motor 18 rotates in the reverse rotation direction, it becomes possible to appropriately suppress the torque fluctuation due to the rotor rotation angle θ for each rotation direction.

First Modification Example

A first modification example of the ECU shall now be described.

Figure 7:
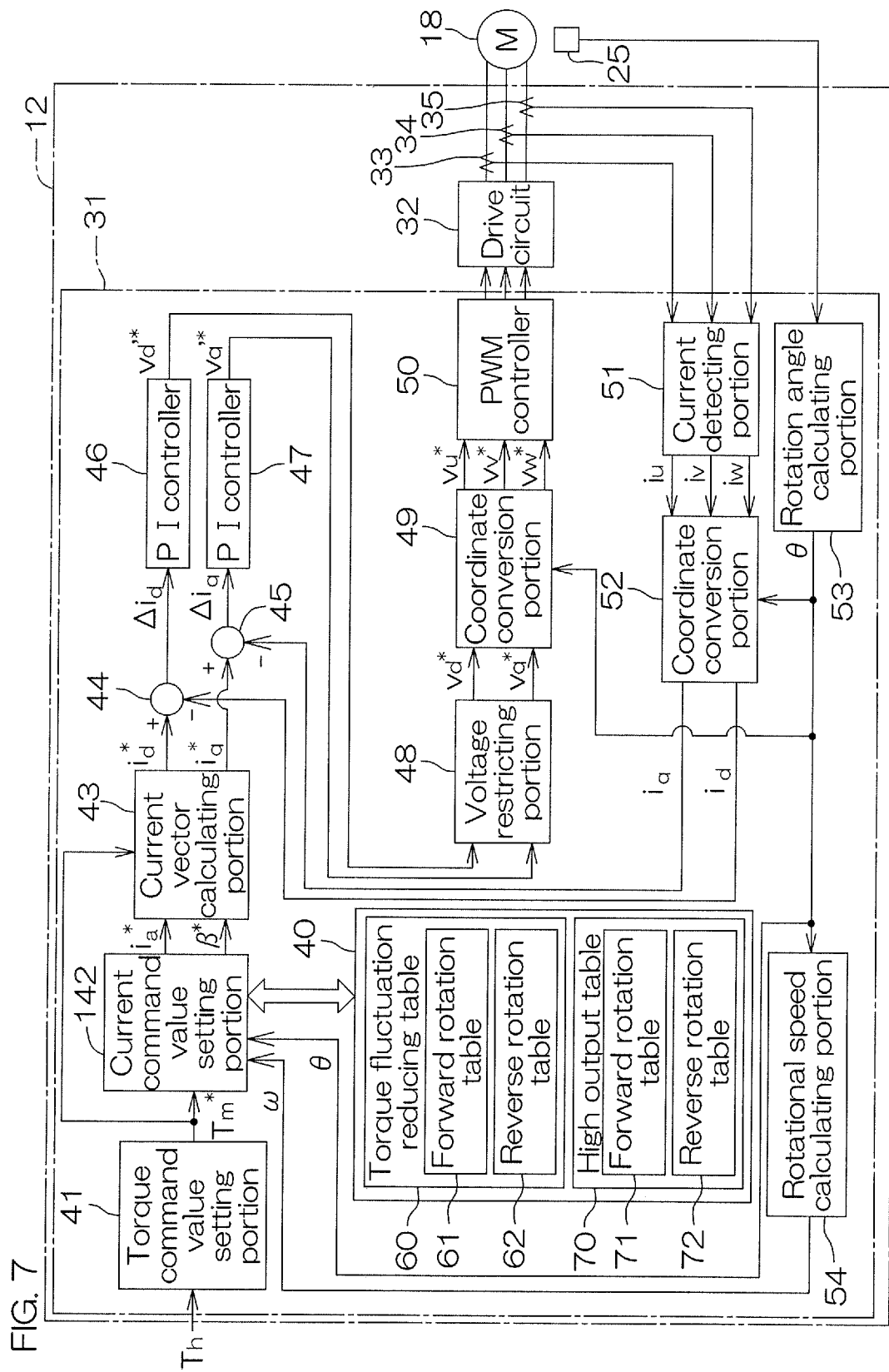
FIG. 7 is an outline view of the electrical arrangement of a first modification example of the ECU.

FIG. 7 is an outline view of the electrical arrangement of the first modification example of the ECU. In FIG. 7, portions corresponding to respective portions of FIG. 3 described above are indicated with the same symbols attached as in FIG. 3.

In comparison to the ECU 12 of FIG. 3, the ECU 12 of FIG. 7 has a rotational speed calculating portion 54 added. Also, with the ECU 12 of FIG. 7, high output tables 71 and 72 are stored in the nonvolatile memory 40 besides the armature current and current phase angle setting tables 61 and 62 described above. Also, with the ECU 12 of FIG. 7, a current command value setting portion 142 is used in place of the current command value setting portion 42 of FIG. 3. Arrangements of the ECU 12 of FIG. 7 other than the above are the same as the arrangements of the ECU 12 of FIG. 3.

The rotational speed calculating portion 54 performs time differentiation of the rotor rotation angle θ calculated by the rotation angle calculating portion 53 to calculate a rotational speed ω [rpm] of the electric motor 18.

When the electric motor 18 is controlled based on the forward rotation table 61 and the reverse rotation table 62 described above, control of low torque fluctuation (torque fluctuation reducing control) can be performed and these tables 61 and 62 shall thus be referred to collectively at times as the torque fluctuation reducing table 60.

Figures 8, 9:
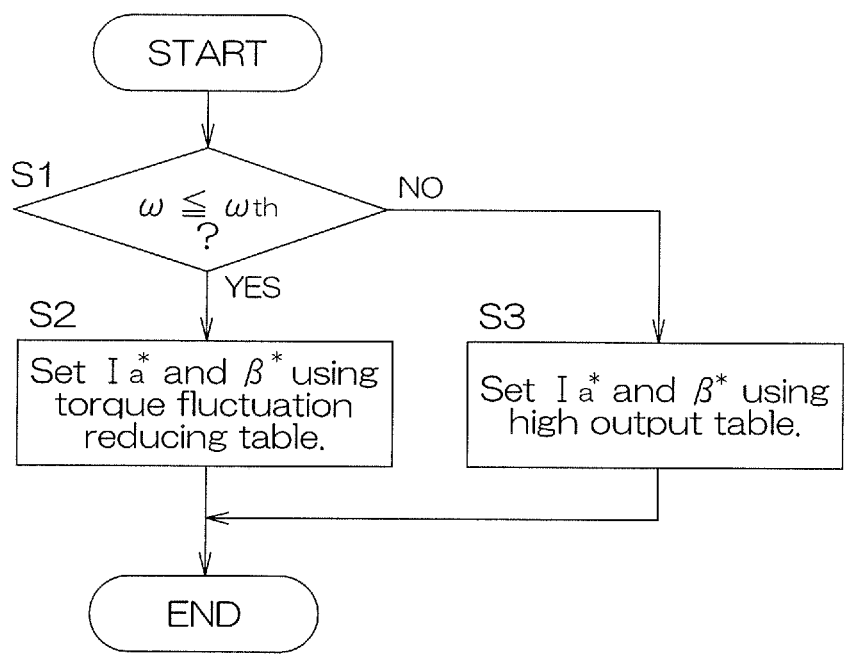
FIG. 8 is a schematic view of a portion of an example of contents of a forward rotation table included in a high output table.
FIG. 9 is a flowchart for describing operations of a current command value setting portion.

Besides the torque fluctuation reducing table 60, a high output table 70 is stored in the nonvolatile memory 40. The high output table 70 includes the forward rotation table 71 and the reverse rotation table 72. As shown in FIG. 8, in the forward rotation table 71, combinations of the armature current command value $I_a^*$ and the current phase angle command value $\beta^*$ at which the motor torque is maximized when the electric motor 18 is rotated in the forward rotation direction are stored according to each rotational speed of the electric motor 18. In the reverse forward rotation table 72, combinations of the armature current command value $I_a^*$ and the current phase angle command value $\beta^*$ at which the motor torque is maximized when the electric motor 18 is rotated in the reverse rotation direction are stored according to each rotational speed of the electric motor 18.

FIG. 9 is a flowchart for describing operations of the current command value setting portion 142. The process of FIG. 9 is executed repeatedly at each predetermined calculation cycle. In the following description, the newest rotational speed ω calculated by the rotational speed calculating portion 54 shall be referred to as the "present rotational speed ω."

The current command value setting portion 142 judges whether or not the present rotational speed ω is not more than a predetermined rotational speed $\omega_{th}$ (step S1). The predetermined rotational speed $\omega_{th}$ is, for example, set to a rotational speed in a vicinity of a boundary point between a constant torque range in which torque is substantially fixed (low speed range) and a constant output range in which the rotational speed is higher than in the constant torque range in speed-torque characteristics of the electric motor 18.

If the present rotational speed co is not more than the predetermined rotational speed $\omega_{th}$ (step S1: YES), the current command value setting portion 142 sets the armature current command value $I_a^*$ and the current phase angle command value $\beta^*$ for making the motor torque that is in accordance with the motor torque command value $T_m^*$ be generated from the electric motor 18 at the present rotor rotation angle θ based on the torque fluctuation reducing table 60 (step S2). In this process, which of the forward rotation table 61 and the reverse rotation table 62 is to be used is judged based on the sign of the motor torque command value $T_m^*$. The process in the current calculation cycle is then ended.

If in step S1, the present rotational speed ω is judged to be greater than the predetermined rotational speed $\omega_{th}$, the current command value setting portion 142 sets the armature current command value $I_a^*$ and the current phase angle command value $\beta^*$ with which the motor torque is maximized at the present rotational speed ω based on the high output table 70 (step S3). In this process, which of the forward rotation table 71 and the reverse rotation table 72 is to be used is judged based on the sign of the motor torque command value $T_m^*$. The process in the current calculation cycle is then ended.

With the present preferred embodiment, control placing priority on reduction of torque fluctuation can be performed when the rotational speed ω of the electric motor 18 is not more than the predetermined rotational speed $\omega_{th}$. On the other hand, when the rotational speed ω of the electric motor 18 is greater than the predetermined rotational speed $\omega_{th}$, control placing priority on output improvement can be performed. A high output can thereby be obtained in a high speed range of the electric motor 18.

Second Modification Example

A second modification example of the ECU 12 shall now be described. The ECU 12 according to the second modification example is a control unit arranged to control a synchronous reluctance motor that includes two systems of stator coils.

A torque generated by a synchronous reluctance motor that includes two systems of stator coils shall now be described.

A basic torque formula of a synchronous reluctance motor is expressed by the formula (3) described above.

$$T_m = P_n \cdot (L_d - L_q) \cdot i_d \cdot i_q \quad (3)$$

Therefore, torques $T_{m1}$ and $T_{m2}$ that are respectively generated when a first system and a second system are driven individually are as expressed by the following formulas (7) and (8). Here, $i_{d1}$ and $i_{q1}$ respectively represent the d-axis current and the q-axis current of the first system, and $i_{d2}$ and $i_{q2}$ respectively represent the d-axis current and the q-axis current of the second system.

$$T_{m1} = P_n \cdot (L_d - L_q) \cdot i_{d1} \cdot i_{q1} \quad (7)$$

$$T_{m2} = P_n \cdot (L_d - L_q) \cdot i_{d2} \cdot i_{q2} \quad (8)$$

If it is deemed that the first system and the second system do not influence each other, a torque $T_m$ when the first system and the second system are driven simultaneously will be as expressed by the following formula (9). If the two systems are driven with the same d-axis current $i_d$ ($=i_{d1}=i_{d2}$) and the same q-axis current $i_q$ ($=i_{q1}=i_{q2}$), the torque will be as expressed by the following formula (10).

$$T_m = T_{m1} + T_{m2} = P_n\{(L_d-L_q) \cdot i_{d1} \cdot i_{q1}\} + P_n\{(L_d-L_q) \cdot i_{d2} \cdot i_{q2}\} \quad (9)$$

$$T_m = T_{m1} + T_{m2} = 2P_n \cdot (L_d-L_q) \cdot i_d \cdot i_q \quad (10)$$

However, depending on a configuration method of the stator coil of the first system and the stator coil of the second system, each system will be mutually influenced by a magnetic flux that the stator coil of the other system applies to the rotor. In such a case, the torque $T_{m1}$ generated by the first system and the torque $T_{m2}$ generated by the second system are expressed, for example, by the following formulas (11) and (12).

$$T_{m1} = P_n\{(L_d-L_q) \cdot i_{d1} \cdot i_{q1} + (L_d-L_q) \cdot i_{d2} \cdot i_{q1}\} \quad (11)$$

$$T_{m2} = P_n\{(L_d-L_q) \cdot i_{d2} \cdot i_{q2} + (L_d-L_q) \cdot i_{d1} \cdot i_{q2}\} \quad (12)$$

The second term in formula (11) represents torque that is generated by interlinkage with a magnetic flux $(L_d-L_q) \cdot i_{d2}$ that the second system applies to the rotor. Similarly, the second term in formula (12) represents torque that is generated by interlinkage with a magnetic flux $(L_d-L_q) \cdot i_{d1}$ that the first system applies to the rotor.

The torque $T_m$ obtained by driving the first system and the second system simultaneously is thus as expressed by the following formula (13) and in a case where the two systems are driven with the same input, the following formula (14) is obtained by setting $i_{d1}=i_{d2}=i_d$ and $i_{q1}=i_{q2}=i_q$.

$$T_m = T_{m1} + T_{m2} = P_n\{(L_d-L_q) \cdot i_{d1} \cdot i_{q1} + (L_d-L_q) \cdot i_{d2} \cdot i_{q1}\} + P_n\{(L_d-L_q) \cdot i_{d2} \cdot i_{q2} + (L_d-L_q) \cdot i_{d1} \cdot i_{q2}\} \quad (13)$$

$$T_m = T_{m1} + T_{m2} = 4P_n \cdot (L_d-L_q) \cdot i_d \cdot i_q \quad (14)$$

That is, in theory, a torque that is twice that in the case of formula (10) is obtained.

As described above, with the synchronous reluctance motor that includes the two systems of stator coils, the motor torque in the case of driving both systems simultaneously is not a sum total of the motor torques in the case of driving each system independently. Therefore, even if armature current and current phase angle setting tables are prepared according to each system by performing experiments instates of driving each system independently and the armature current command values and the current phase angle command values of the respective systems are set using these tables, a motor torque that is in accordance with the motor torque command value $T_m^*$ cannot be output.

The ECU 12 according to the second modification example thus provides a motor control method that enables a synchronous reluctance motor that includes two systems of stator coils to output a motor torque that is in accordance with the motor torque command value $T_m^*$.

Figure 10:
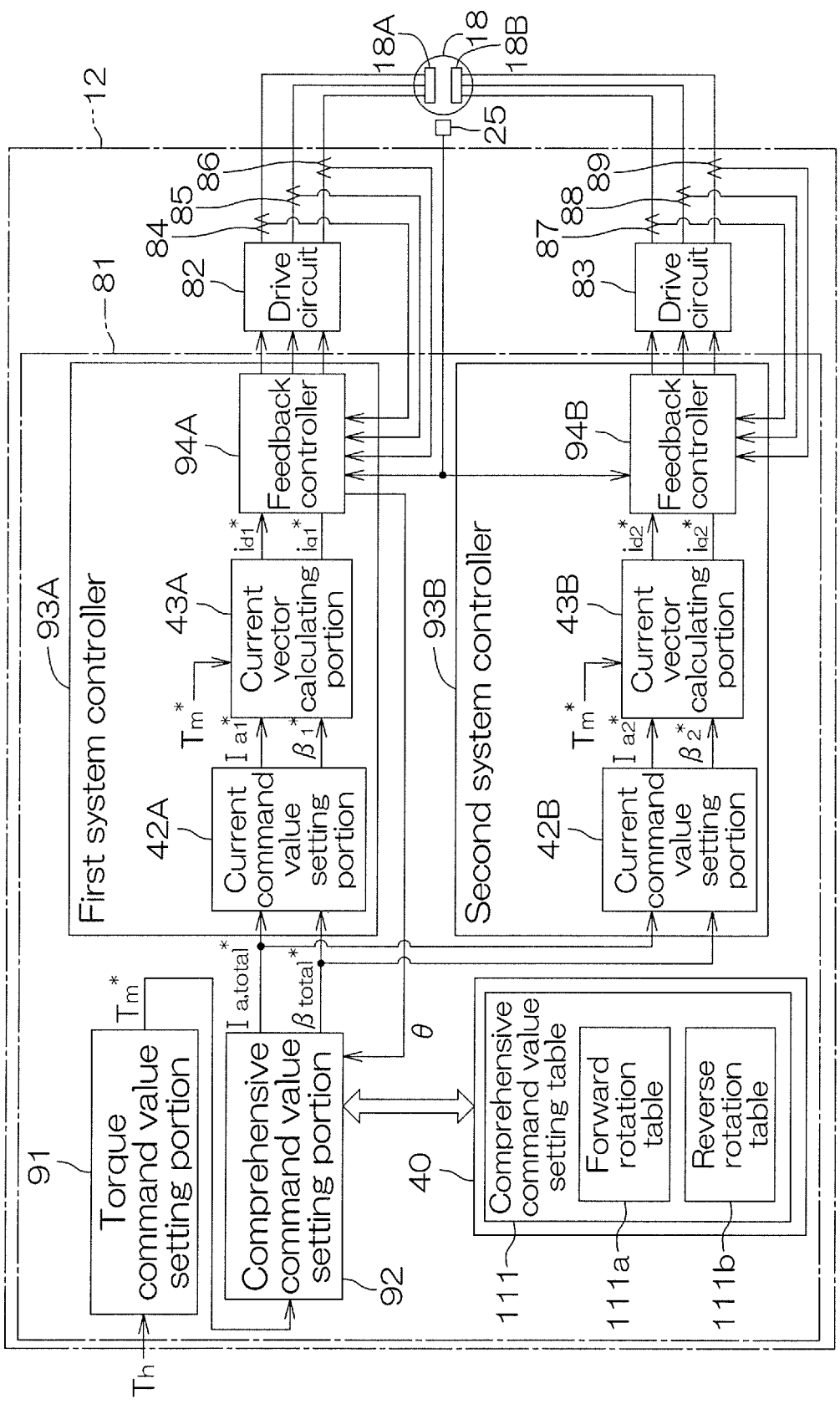
FIG. 10 is an outline view of the electrical arrangement of a second modification example of the ECU.

FIG. 10 is an outline view of the electrical arrangement of the second modification example of the ECU.

The electric motor 18 is a synchronous reluctance motor that includes a stator coil 18A of a first system and a stator coil 18B of a second system. The stator coil 18A and the stator coil 18B of the respective systems each have stator coils of the U-phase, the V-phase, and the W-phase.

The ECU 12 includes a microcomputer 81, a first system drive circuit 82, a second system drive circuit 83, first system current sensors 84, 85, and 86, and second system current sensors 87, 88, and 89. The first system drive circuit 82 and the second system drive circuit 83 are, for example, three-phase inverter circuits. The first system current sensors 84, 85, and 86 include three current sensors that detect currents of the respective U, V, and W phases of the first system. The second system current sensors 87, 88, and 89 include three current sensors that detect currents of the respective U, V, and W phases of the second system. The electric motor 18 is provided with the rotation angle sensor 25 arranged to detect the rotational angle of the rotor.

The microcomputer 81 includes a CPU and a memory and is arranged to function as a plurality of function processing portions by execution of a predetermined program. The memory includes a ROM, a RAM, the nonvolatile memory 40, etc. The plurality of function processing portions include a torque command value setting portion 91, a comprehensive command value setting portion 92, a first system controller 93A, and a second system controller 93B.

As with the torque command value setting portion 41 of FIG. 3, the torque command value setting portion 91 sets the motor torque command value $T_m^*$ that is the command value of the motor torque to be generated by the electric motor 18. The motor torque command value $T_m^*$ set by the torque command value setting portion 91 is provided to the comprehensive command value setting portion 92 and current vector calculating portions 43A and 43B (see FIG. 10) to be described below.

A comprehensive command value setting table 111 for setting comprehensive command values for the entire system subsuming the two systems is stored in the nonvolatile memory 40. The comprehensive command values are constituted of an armature current command value (hereinafter referred to as the "comprehensive current command value $I_{a,total}^*$"; $I_{a,total}^*>0$) and a current phase angle command value (hereinafter referred to as the "comprehensive phase angle command value $\beta_{total}^*$"; $\beta_{total}^*>0$) for the entire system subsuming the two systems.

The comprehensive command value setting table 111 includes a table for forward rotation (CCW) (hereinafter referred to as the "forward rotation table 111a") and a table for reverse rotation (CW) (hereinafter referred to as the "reverse rotation table 111b"). Details of the tables 111a and 111b shall be described below.

The comprehensive command value setting portion 92 sets the comprehensive current command value $I_{a,total}^*$ and the comprehensive phase angle command value $\beta_{total}^*$ based on the motor torque command value $T_m^*$, the rotor rotation angle θ provided from a rotation angle calculating portion 53A (see FIG. 11) to be described below, and a table out of the tables 111a and 111b that is in accordance with the sign of the motor torque command value $T_m^*$. Details of the comprehensive command value setting portion 92 shall be described below.

The first system controller 93A controls the first system drive circuit 82 based on the comprehensive current command value $I_{a,total}^*$ and the comprehensive phase angle command value $\beta_{total}^*$ to control currents supplied to the stator coil 18A of the first system. The second system controller 93B controls the second system drive circuit 83 based on the comprehensive current command value $I_{a,total}^*$ and the comprehensive phase angle command value $\beta_{total}^*$ to control currents supplied to the stator coil 18B of the second system.

The first system controller 93A and the second system controller 93B include current command value setting portions 42A and 42B, current vector calculating portions 43A and 43B, and current feedback controllers 94A and 94B.

Figure 11:
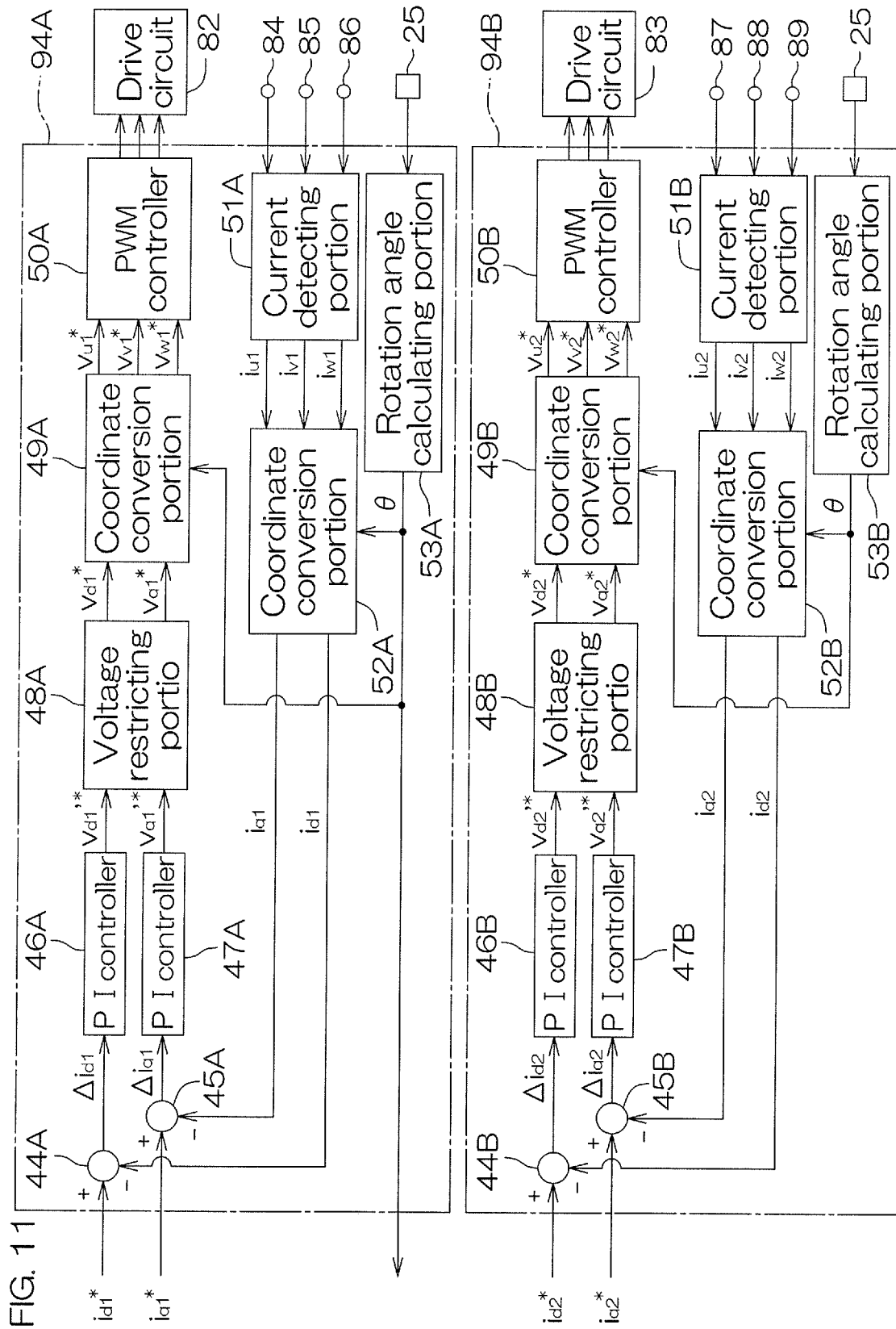
FIG. 11 is an outline view of the arrangement of current feedback controllers of respective systems.

As shown in FIG. 11, the current feedback controllers 94A and 94B include d-axis current deviation calculating portions 44A and 44B, q-axis current deviation calculating portions 45A and 45B, d-axis PI controllers 46A and 46B, q-axis PI controllers 47A and 47B, voltage restricting portions 48A and 48B, two-phase/three-phase coordinate conversion portions 49A and 49B, PWM controllers 50A and 50B, current detecting portions 51A and 51B, three-phase/two-phase coordinate conversion portions 52A and 52B, and rotation angle calculating portion 53A and 53B.

Returning to FIG. 10, the current command value setting portions 42A and 42B calculate armature current command values $I_{a1}^*$ and $I_{a2}^*$ current phase angle command values $\beta_1^*$ and $\beta_2^*$ for the first and second systems based on the comprehensive current command value $I_{a,total}^*$ and the comprehensive phase angle command value $\beta_{total}^*$ and using the following formulas (15) and (16).

$$I_{a1}^* = I_{a,total}^*/2, \beta_1^* = \beta_{total}^* \quad (15)$$

$$I_{a2}^* = I_{a,total}^*/2, \beta_2^* = \beta_{total}^* \quad (16)$$

The current vector calculating portions 43A and 43B calculate d-axis current command values $i_{d1}^*$ and $i_{d2}^*$ and q-axis current command values $i_{q1}^*$ and $i_{q2}^*$ for the first and second systems. Specifically, the current vector calculating portions 43A and 43B calculate the d-axis current command values $i_{d1}^*$ and $i_{d2}^*$ based on the following formulas (17) and (18).

$$i_{d1}^* = I_{a1}^* \cdot \cos \beta_1^* \quad (17)$$

$$i_{d2}^* = I_{a2}^* \cdot \cos \beta_2^* \quad (18)$$

Also, the current vector calculating portion 43A calculates the q-axis current command value $i_{q1}^*$ based on the following formula (19a) or (19b) and the current vector calculating portion 43B calculates the q-axis current command value $i_{q2}^*$ based on the following formula (20a) or (20b).

$$\text{If } T_m^* \geq 0: i_{q1}^* = I_{a1}^* \cdot \sin \beta_1^* \quad (19a)$$

$$\text{If } T_m^* < 0: i_{q1}^* = I_{a1}^* \cdot \sin(-\beta_1^*) \quad (19b)$$

$$\text{If } T_m^* \geq 0: i_{q2}^* = I_{a2}^* \cdot \sin \beta_2^* \quad (20a)$$

$$\text{If } T_m^* < 0: i_{q2}^* = I_{a2}^* \cdot \sin(-\beta_2^*) \quad (20b)$$

Referring to FIG. 11, the rotation angle calculating portions 53A and 53B calculate the rotation angle (rotor rotation angle θ) of the rotor of the electric motor 18 based on the output signal of the rotation angle sensor 25.

The current detecting portions 51A and 51B detect the phase currents $i_{U1}, i_{V1}, i_{W1}$ and $i_{U2}, i_{V2}, i_{W2}$ of the U-phase, the V-phase, and the W-phase based on output signals of the current sensors 84, 85, 86 and 87, 88, 89. The three-phase/two-phase coordinate conversion portions 52A and 52B use the rotor rotation angle θ calculated by the rotation angle calculating portions 53A and 53B to convert the phase currents $i_{U1}, i_{V1}, i_{W1}$ and $I_{U2}, i_{V2}, i_{W2}$ of the three phases to d-axis currents $i_{d1}$ and $i_{d2}$ and q-axis currents $i_{q1}$ and $i_{q2}$.

The d-axis current deviation calculating portions 44A and 44B calculate deviations $\Delta i_{d1}$ ($=i_{d1}^* - i_{d1}$) and $\Delta i_{d2}$ ($=i_{d2}^* - i_{d2}$) between the d-axis current command values $i_{d1}^*$ and $i_{d2}^*$ and the d-axis currents $i_{d1}$ and $i_{d2}$ flowing through the stator coils of the corresponding systems. The q-axis current deviation calculating portions 45A and 45B calculate deviations $\Delta i_{q1}$ ($=i_{q1}^* - i_{q1}$) and $\Delta i_{q2}$ ($=i_{q2}^* - i_{q2}$) between the q-axis current command values $i_{q1}^*$ and $i_{q2}^*$ and the q-axis currents $i_{q1}$ and $i_{q2}$ flowing through the stator coils of the corresponding systems.

The d-axis PI controllers 46A and 46B perform PI (proportional/integral) calculation on the d-axis current deviations $\Delta i_{d1}$ and $\Delta i_{d2}$ to calculate d-axis instruction voltages $v_{d1}'^*$ and $v_{d2}'^*$ for the first system and the second system. The q-axis PI controllers 47A and 47B perform PI calculation on the q-axis current deviations $\Delta i_{q1}$ and $\Delta i_{q2}$ to calculate q-axis instruction voltages $v_{q1}'^*$ and $v_{q2}'^*$ for the first system and the second system.

The voltage restricting portions 48A and 48B, for example, restrict the d-axis instruction voltages $v_{d1}'^*$ and $v_{d2}'^*$ to not more than a preset d-axis voltage command maximum value and restrict the q-axis instruction voltages $v_{q1}'^*$ and $v_{q2}'^*$ to not more than a preset q-axis voltage command maximum value. d-axis instruction voltages $v_{d1}^*$ and $v_{d2}^*$ and q-axis instruction voltage $v_{q1}^*$ and $v_{q2}^*$ after the restriction process by the voltage restricting portions 48A and 49B are provided to the two-phase/three-phase coordinate conversion portions 49A and 49B of the corresponding systems.

The two-phase/three-phase coordinate conversion portions 49A and 49B use the rotor rotation angle θ calculated by the rotation angle calculating portions 53A and 53B to convert the d-axis instruction voltages $v_{d1}^*$ and $v_{d2}^*$ and the q-axis instruction voltages $v_{q1}^*$ and $v_{q2}^*$ to instruction voltages $v_{U1}^*, v_{V1}^*, v_{W1}^*$ and $v_{U2}^*, v_{V2}^*, v_W2^*$ for the U phase, the V phase, and the W phase.

The PWM controllers 50A and 50B generate U-phase PWM control signals, V-phase PWM control signals, and W-phase PWM control signals of duty ratios respectively corresponding to the instruction voltages $v_{U1}^*, v_{V1}^*, v_{W1}^*$ and $v_{U2}^*, v_{V2}^*, V_{W2}^*$. Power elements constituting the drive circuits 82 and 83 of the respective systems are controlled by the PWM control signals. The stator coils of the respective phases of the respective systems are thereby energized in accordance with the instruction voltages $v_{U1}^*, v_{V1}^*, v_{W1}^*$ and $v_{U2}^*, v_{V2}^*, V_{W2}^*$.

The forward rotation table 111a, the reverse rotation table 111b, and the comprehensive command value setting portion 92 shown in FIG. 10 shall now be described in detail.

FIG. 12 is a schematic view of a portion of an example of contents of the forward rotation table 111a.

In the forward rotation table 111a, motor torques $T_m$ [Nm] generated from the electric motor 18 are stored according to each rotor rotation angle θ with respect to combinations of the comprehensive current command value $I_{a,total}^*$ and the comprehensive phase angle command value $\beta_{total}^*$ at which the motor torque $T_m$ is maximized for the comprehensive current command value $I_{a,total}^*$ when the electric motor 18 is rotated in the forward rotation direction. Here, the forward rotation table 111*a* is prepared on a premise that the current command value setting portions 42A and 42B calculate the armature current command values $I_{a1}^*$ and $I_{a2}^*$ and current phase angle command values $\beta_1^*$ and $\beta_2^*$ based on the comprehensive current command values $I_{a,total}^*$ and the comprehensive phase angle command values $\beta_{total}^*$ and using the formulas (15) and (16).

In the example of FIG. 12, N comprehensive current command values $I_{a,total}^*$ are in a relationship of $I_{a,total}^*{}_1 < I_{a,total}^*{}_2 < \ldots I_{a,total}^*{}_N$. M rotor rotation angles $\theta$ are set to be of a predetermined angular increment from 0 deg to 360 deg such as to realize a resolution sufficient to express changes of the motor torque $T_m$.

Such a forward rotation table 111*a* is prepared, for example, as follows. A predetermined comprehensive current command value $I_{a,total}^*$ and a predetermined comprehensive phase angle command value $\beta_{total}^*$ are provided to the current command value setting portions 42A and 42B of a motor control circuit such as shown in FIG. 10 and a sign representing the forward rotation direction is provided to the current vector calculating portions 43A and 43B. The electric motor 18 is thereby driven to rotate forward based on the d-axis and q-axis current command values $i_{d1}^*$, $i_{q1}^*$ and $i_{d2}^*$, $i_{q2}^*$ that are in accordance with the comprehensive current command value $I_{a,total}^*$, the comprehensive phase angle command value $\beta_{total}^*$, and the sign. In the state where the electric motor 18 is being driven to rotate forward, the motor torque $T_m$ generated from the electric motor 18 and the rotor rotation angle $\theta$ are acquired. The motor torque $T_m$ according to each rotor rotation angle $\theta$ is thereby obtained with respect to the combination of the predetermined comprehensive current command value $I_{a,total}^*$ and the predetermined comprehensive phase angle command value $\beta_{total}^*$. Here, the motor torque $T_m$ is measured using a measurement device that is not shown.

By performing such an experiment for each of a plurality of comprehensive phase angle command values $\beta_{total}^*$, data of the motor torque $T_m$ according to each rotor rotation angle $\theta$ are obtained with respect to respective combinations of the predetermined comprehensive current command value $I_{a,total}^*$ and the plurality of comprehensive phase angle command values $\beta_{total}$. Based on the data thus acquired, the comprehensive phase angle command value $\beta_{total}^*$ at which the motor torque $T_m$ is maximized for the predetermined comprehensive current command value $I_{a,total}^*$ is specified.

Such experiments as the above are performed for each of a plurality of comprehensive current command values $I_{a,total}^*$ to acquire, for each of the plurality of comprehensive current command values $I_{a,total}^*$, data of the motor torque $T_m$ according to each rotor rotation angle $\theta$ with respect to the combination of the comprehensive current command value $I_{a,total}^*$ and the comprehensive phase angle command value $\beta_{total}^*$ at which the motor torque $T_m$ is maximized for the comprehensive current command value $I_{a,total}^*$. The data for preparing the forward rotation table 111*a* are thereby obtained.

Although not illustrated, in the reverse rotation table 111*b*, motor torques $T_m$ [Nm] generated from the electric motor 18 are stored according to each rotor rotation angle $\theta$ with respect to combinations of the comprehensive current command value $I_{a,total}^*$ and the comprehensive phase angle command value $\beta_{total}^*$ at which the motor torque $T_m$ is maximized for the comprehensive current command value $I_{a,total}^*$ when the electric motor 18 is rotated in the reverse rotation direction.

The reverse rotation table 111*b* is prepared by performing experiments similar to the experiments performed to prepare the forward rotation table 111*a*. However, unlike in the case of preparing the forward rotation table 111*a*, a sign representing the reverse rotation direction is provided to the current vector calculating portions 43A and 43B during the experiments in preparing the reverse rotation table 111*b*. The electric motor 18 is thereby driven to rotate in the reverse rotation direction during the experiments.

Next, operations of the comprehensive command value setting portion 92 shall be described in detail. In the following description, the newest rotor rotation angle $\theta$ calculated by the rotation angle calculating portion 53A shall be referred to as the "present rotor rotation angle $\theta$."

The comprehensive command value setting portion 92 first selects, from between the forward rotation table 111*a* and the reverse rotation table 111*b*, the table 111*a* or 111*b* of the rotation direction that is in accordance with the sign of the motor torque command value $T_m^*$. Then based on the selected table 111*a* or 111*b*, the comprehensive command value setting portion 92 sets the comprehensive current command value $I_{a,total}^*$ and the comprehensive phase angle command value $\beta_{total}^*$ for making the motor torque that is in accordance with the motor torque command value $T_m^*$ be generated from the electric motor 18 at the present rotor rotation angle $\theta$.

Specifically, the comprehensive command value setting portion 92 searches the plurality of motor torques $T_m$ corresponding to the present rotor rotation angle $\theta$ in the selected table 111*a* or 111*b* for a motor torque $T_m$ of the same magnitude as the motor torque command value $T_m^*$. If the motor torque $T_m$ of the same magnitude as the motor torque command value $T_m^*$ could be found, the comprehensive command value setting portion 92 reads, from the table 111*a* or 111*b*, the comprehensive current command value $I_{a,total}^*$ and the comprehensive phase angle command value $\beta_{total}^*$ corresponding to the motor torque $T_m$ and sets the command values in the current command value setting portions 42A and 42B.

On the other hand, if the motor torque $T_m$ of the same magnitude as the motor torque command value $T_m^*$ could not be found, the comprehensive command value setting portion 92 performs a process such as the following. The comprehensive command value setting portion 92 reads the comprehensive current command value $I_{a,total}^*$ and the comprehensive phase angle command value $\beta_{total}^*$ corresponding to a motor torque $T_m$, among the plurality of motor torques $T_m$ corresponding to the present rotor rotation angle $\theta$ in the selected table 111*a* or 111*b*, that is of the closest magnitude less than the motor torque command value $T_m^*$ (hereinafter referred to as the "first motor torque $T_m1$").

Also, the comprehensive command value setting portion 92 reads the comprehensive current command value $I_{a,total}^*$ and the comprehensive phase angle command value $\beta_{total}^*$ corresponding to a motor torque $T_m$, among the plurality of motor torques $T_m$ corresponding to the present rotor rotation angle $\theta$ in the table 111*a* or 111*b*, that is of the closest magnitude greater than the motor torque command value $T_m^*$ (hereinafter referred to as the "second motor torque $T_m2$"). The comprehensive command value setting portion 92 then performs linear interpolation on the two sets of the comprehensive current command value $I_{a,total}^*$ and the comprehensive phase angle command value $\beta_{total}^*$ that have been read to calculate the comprehensive current command value $I_{a,total}*$ and the comprehensive phase angle command value $\beta_{total}*$ corresponding to the motor torque command value $T_m*$. As the linear interpolation in this case, the same method as the linear interpolation described with the preferred embodiment of FIG. 3 can be used.

With the second modification example, the synchronous reluctance motor can be controlled in consideration of the influence of the magnetic flux that the stator coil of the other system applies to the rotor. The synchronous reluctance motor that includes the two systems of stator coils can thus be controlled with high efficiency.

Third Modification Example

A third modification example of the ECU 12 shall now be described. As with the ECU 12 according to the second modification example, the ECU 12 according to the third modification example is a control unit that controls a synchronous reluctance motor that includes two systems of stator coils.

Figure 13:
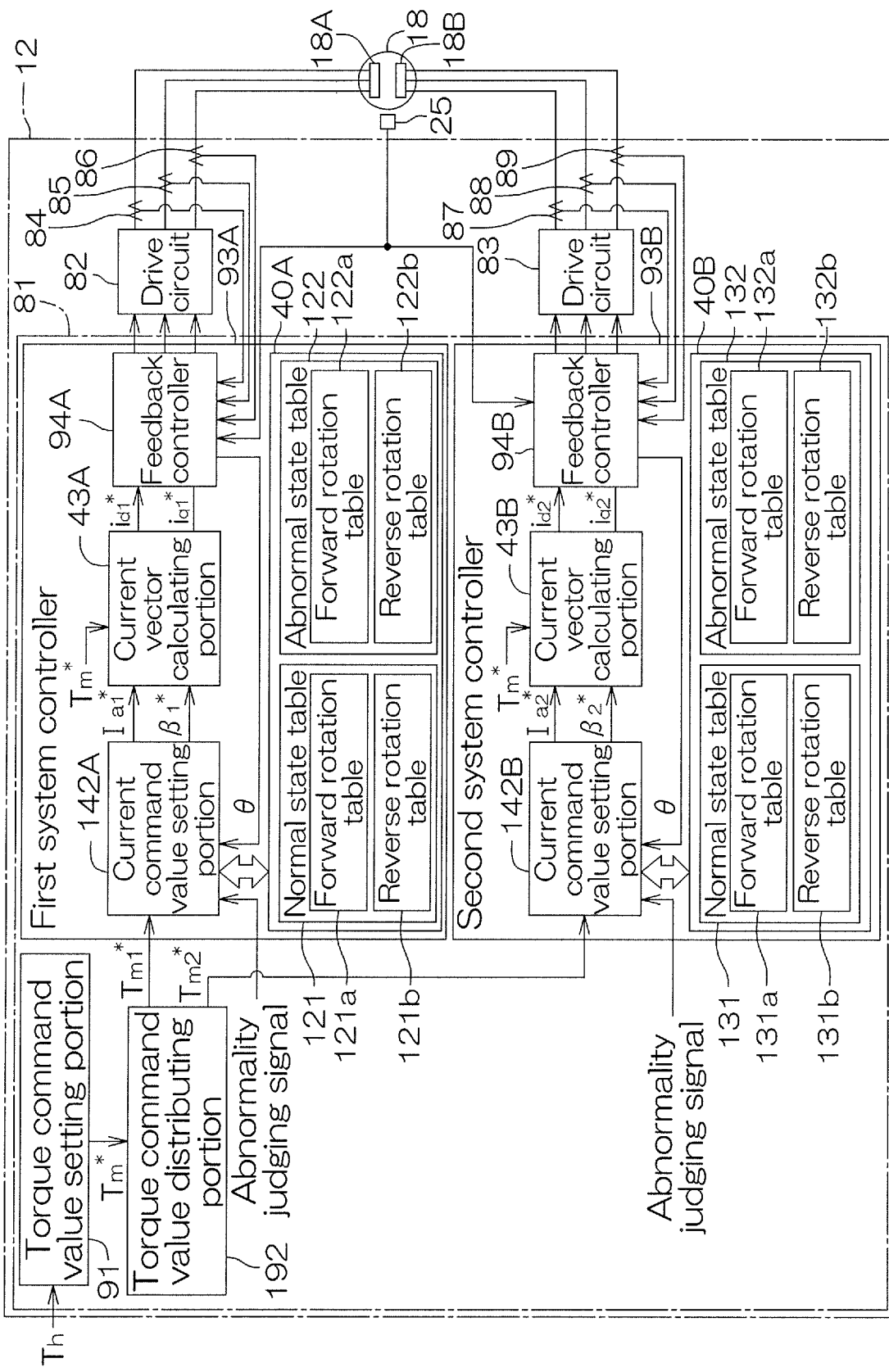
FIG. 13 is an outline view of the electrical arrangement of a third modification example of the ECU.

FIG. 13 is an outline view of the electrical arrangement of the third modification example of the ECU. In FIG. 13, portions corresponding to respective portions of FIG. 10 described above are indicated with the same symbols attached as in FIG. 10.

The electric motor 18 is a synchronous reluctance motor that includes the stator coil 18A of the first system and the stator coil 18B of the second system.

The microcomputer 81 inside the ECU 12 includes the torque command value setting portion 91, a torque command value distributing portion 192, the first system controller 93A, and the second system controller 93B. The first system controller 93A and the second system controller 93B include current command value setting portions 142A and 142B, the current vector calculating portions 43A and 43B, and the current feedback controllers 94A and 94B.

In place of the comprehensive command value setting portion 92 in the ECU 12 of FIG. 10, the ECU 12 of FIG. 13 is provided with the torque command value distributing portion 192. Also, in place of the current command value setting portions 42A and 42B in the ECU 12 of FIG. 10, the ECU 12 of FIG. 13 is provided with the current command value setting portions 142A and 142B. Further, with the ECU 12 of FIG. 13, the nonvolatile memory 40 includes a first memory 40A that stores a table used at the current command value setting portion 142A of the first system and a second memory 40B that stores a table used at the current command value setting portion 142B of the second system. The first memory 40A and the second memory 40B may be formed inside a single nonvolatile memory 40 or may be respectively constituted of physically different nonvolatile memories. Arrangements of the ECU 12 of FIG. 13 other than the above are the same as the arrangements of the ECU 12 of FIG. 12.

The torque command value distributing portion 192, the current command value setting portions 142A and 142B, and the tables stored in the memories 40A and 40B shall now be described.

The torque command value distributing portion 192 distributes the motor torque command value $T_m*$ set by the torque command value setting portion 91 between the current command value setting portions 142A and 142B for the first system and the second system. In the present preferred embodiment, the torque command value distributing portion 192 distributes ½ of the motor torque command value $T_m*$ to each of the current command value setting portions 142A and 142B. Therefore, if the torque command values provided to the current command value setting portion 142A and the current command value setting portion 142B are $T_{m1}*$ and $T_{m2}*$, respectively, $T_{m1}*=T_{m2}*=T_m*/2$.

In the first memory 40A are stored a normal state table 121 that is used at the current command value setting portion 142A of the first system when the first and second systems are normal and an abnormal state table 122 that is used at the current command value setting portion 142A of the first system when the second system is abnormal. The respective tables 121 and 122 include forward rotation tables 121a and 122a and reverse rotation tables 121b and 122b.

In the second memory 40B are stored a normal state table 131 that is used at the current command value setting portion 142B of the second system when the first and second systems are normal and an abnormal state table 132 that is used at the current command value setting portion 142B of the second system when the first system is abnormal. The respective tables 131 and 132 include forward rotation tables 131a and 132a and reverse rotation tables 131b and 132b.

FIG. 14A is a schematic view of a portion of an example of contents of the forward rotation table 121a included in the normal state table 121 for the first system, and FIG. 14B is a schematic view of a portion of an example of contents of the forward rotation table 131a included in the normal state table 131 for the second system.

The forward rotation tables 121a and 131a for the first and second systems are tables for setting the armature current command values $I_{a1}*$ and $I_{a2}*$ and the current phase angle command values $\beta_1*$ and $\beta_2*$ for the corresponding systems in a normal/forward rotation state in which the respective systems are driven simultaneously and the electric motor 18 is rotated in the forward rotation direction. In each of the forward rotation tables 121a and 131a, motor torques $T_m$ [Nm] generated from the electric motor 18 are stored according to each rotor rotation angle θ with respect to combinations of the armature current command value $I_{a1}*$ or $I_{a2}*$ and the current phase angle command value $\beta_1*$ $\beta_2*$ at which the motor torque $T_m$ is maximized for the armature current command value $I_{a1}*$ or $I_{a2}*$ in the normal/forward rotation state. Here, the forward rotation tables 121a and 131a are prepared on a premise that ½ of the motor torque command value $T_m*$ is distributed to each of the current command value setting portions 142A and 142B in the normal/forward rotation state.

The forward rotation tables 121a and 131a are prepared, for example, based on the forward rotation table 111a of the second modification example (see FIG. 12). Specifically, as $I_{a1}*_i$ (i=1, 2, 3, . . . N) in the forward rotation table 121a of FIG. 14A and $I_{a2}*_i$ (i=1, 2, 3, . . . N) in the forward rotation table 131a of FIG. 14B, ½ of the values of the corresponding $I_{a,total}*_i$ (i=1, 2, 3, . . . N) in the forward rotation table 111a of FIG. 12 are set.

Also, as $\beta_1*_i$ (i=1, 2, 3, . . . N) in the forward rotation table 121a of FIG. 14A and $\beta_2*_i$ (i=1, 2, 3, . . . N) in the forward rotation table 131a of FIG. 14B, the values of the corresponding $\beta_{total}*_i$ (i=1, 2, 3, . . . N) in the forward rotation table 111a of FIG. 12 are set as they are.

Further, as $T_{i,k}$ (i=1, 2, 3, . . . N; k=1, 2, 3, . . . M) in the forward rotation tables 121a and 131a of FIG. 14A and FIG. 14B, ½ of the values of the corresponding $T_{i,k}$ (i=1, 2, 3, . . . N; k=1, 2, 3, . . . M) in the forward rotation table 111a of FIG. 12 are set. The forward rotation tables 121a and 131a are thereby obtained.

The reverse rotation tables 121b and 131b included in the normal state tables 121 and 131 can also be prepared by a similar method based on the reverse rotation table 111b of the second modification example.

The forward rotation tables 122a and 132a included in the abnormal state tables 122 and 132 for the first and second systems are tables for setting the armature current command values $I_{a1}^*$ and $I_{a2}^*$ and the current phase angle command values $\beta_1^*$ and $\beta_2^*$ in an abnormal/forward rotation state in which just the corresponding system out of the two systems is driven and the electric motor 18 is rotated in the forward rotation direction.

Also, the reverse rotation tables 122b and 132b included in the abnormal state tables 122 and 132 are tables for setting the armature current command values $I_{a1}^*$ and $I_{a2}^*$ and the current phase angle command values $\beta_1^*$ and $\beta_2^*$ in an abnormal/reverse rotation state in which just the corresponding system is driven and the electric motor 18 is rotated in the reverse rotation direction.

Although the abnormal state tables 122a, 122b, 132a, and 132b have the same structure as the normal state tables 121a, 121b, 131a, and 131b, the values $I_{a1}^*{}_i$, $_{a2}^*{}_i$, $\beta_1^*{}_i$, $\beta_2^*{}_i$ and $T_{i,k}$ in the tables differ from those of the normal state tables 121a, 121b, 131a, and 131b. That is, in each of the abnormal state tables 122a, 122b, 132a, and 132b, motor torques $T_m$ [Nm] generated from the electric motor 18 are stored according to each rotor rotation angle θ with respect to combinations of the armature current command value $I_{a1}^*$ or $I_{a2}^*$ and the current phase angle command value $\beta_1^*$ or $\beta_2^*$ at which the motor torque $T_m$ is maximized for the armature current command value $I_{a1}^*$ or $I_{a2}^*$ in the abnormal state in which just one system out of the two systems is driven.

Each of the abnormal state tables 122 and 132 can be prepared by performing experiments similar to those in the case of preparing the forward rotation table 61 and the reverse rotation table 62 of FIG. 6 with the other system being put in a drive stopped state.

The motor torque command values $T_m^*{}_1$ and $T_m^*{}_2$ distributed by the torque command value distributing portion 192, the rotor rotation angle θ provided from the rotation angle calculating portions 53A and 53B, and abnormality judgment signals each indicating whether or not the other system is abnormal are provided to the current command value setting portions 142A and 142B.

When the abnormality judgment signal that is input therein indicates that the other system is not abnormal (in the normal state), each of the current command value setting portions 142A and 142B sets the command values as follows. That is, each of the current command value setting portions 142A and 142B sets the armature current command value $I_{a1}^*$ or $I_{a2}^*$ and the current phase angle command value $\beta_1^*$ or $\beta_2^*$ based on the motor torque command value $T_{m1}^*$ or $T_{m2}^*$, the rotor rotation angle θ, and the normal state table 121 (121a or 121b) or 131 (131a or 131b) that is in accordance with the sign of the motor torque command value $T_{m1}^*$ or $T_{m2}^*$.

On the other hand, when the abnormality judgment signal that is input therein indicates that the other system is abnormal (in the abnormal state), the current command value setting portion 142A or 142B sets the command values as follows. That is, the current command value setting portions 142A or 142B sets the armature current command value $I_{a1}^*$ or $I_{a2}^*$ and the current phase angle command value $\beta_1^*$ or $\beta_2^*$ based on the motor torque command value $T_{m1}^*$ or $T_{m2}^*$, the rotor rotation angle θ, and the abnormal state table 122 (122a or 122b) or 132 (132a or 132b) that is in accordance with the sign of the motor torque command value $T_{m1}^*$ or $T_{m2}^*$.

With the third modification example, in the normal state in which the two systems are normal, the synchronous reluctance motor can be controlled in consideration of the influence of the magnetic flux that the stator coil of the other system applies to the rotor. The synchronous reluctance motor that includes the two systems of stator coils can thus be controlled with high efficiency. Also with the third modification example, in the abnormal state in which the other system is abnormal, the synchronous reluctance motor can be controlled without consideration of the influence of the magnetic flux that the stator coil of the other system applies to the rotor. Appropriate motor control can thus be performed even in the abnormal state.

Although the preferred embodiment of the present invention has been described above, the present invention can be implemented in yet other modes. Although with the preferred embodiment described above, the microcomputer 31 (81) includes the voltage restricting portion 48 (48A, 48B), it does not have to include the voltage restricting portion 48 (48A, 48B).

Also, although with the preferred embodiment described above, the synchronous reluctance motor that is rotatable in the two directions of the forward rotation direction and the reverse rotation direction was described, the present invention can also be applied to an electric synchronous reluctance motor that is driven to rotate in just one direction.

Also, although with the preferred embodiment described above, the electric motor 18 is a synchronous reluctance motor, as long as it is a motor that rotates a rotor using a reluctance torque, the electric motor 18 may be a motor other than a synchronous reluctance motor (a switched reluctance motor, an IPM motor, etc.).

Also, with the preferred embodiment and the first modification example described above, the motor torques $T_m$ [Nm] generated from the electric motor 18 are stored according to each rotor rotation angle θ with respect to the combinations of the armature current command value $I_a^*$ and the current phase angle command value $\beta^*$ in the armature current and current phase angle setting tables 61 and 62 (see FIG. 3 and FIG. 7). However, the motor torques $T_m$ generated from the electric motor 18 may be stored, irrespectively of the rotor rotation angle θ, with respect to the combinations of the armature current command value $I_a^*$ and the current phase angle command value $\beta^*$ in the armature current and current phase angle setting tables 61 and 62. The same applies to the tables 111, 121, 122, 131, and 132 used in the second and third modification examples.

Also in the description above, the preferred embodiment of the case of applying the present invention to a control device of an electric motor for an electric power steering device was described. However, the present invention can be applied to a motor control device other than a control device of an electric motor for an electric power steering device as long as it is a control device of a motor that is controlled based on a motor torque command value.

While a preferred embodiments of the present invention have been described in detail above, these are merely specific examples used to clarify the technical content of the present invention, and the present invention should not be interpreted as being limited only to these specific examples, and the scope of the present invention shall be limited only by the appended claims.

The present application corresponds to Japanese Patent Application No. 2017-140127 filed on Jul. 19, 2017 in the Japan Patent Office, and the entire disclosure of this applications is incorporated herein by reference.

REFERENCE SIGNS LIST

12 . . . ECU, 18 . . . electric motor, 25 . . . rotation angle sensor, 31,81 . . . microcomputer, 40 . . . nonvolatile memory, 41, 91 . . . torque command value setting portion, 42, 142, 142A, 142B . . . current command value setting portion, 43, 43A, 43B . . . current vector calculating portion, 53, 53A, 53B . . . rotation angle calculating portion, 54 . . . rotational speed calculating portion, 61, 71, 111a, 121a, 122a, 131a, 132a . . . forward rotation table, 62, 72, 111b, 121b, 122b, 131b, 132b . . . reverse rotation table, 92 . . . comprehensive command value setting portion, 192 . . . torque command value distributing portion

The invention claimed is:

1. A motor control device that controls a reluctance torque utilizing a motor, the motor control device comprising:
a memory storing a table in which a plurality of motor torques each generated from the motor during operation is stored in the memory according to each detected rotor rotation angle of a plurality of rotor rotation angles of the motor with respect to a combination of an armature current command value and a current phase angle command value at which the motor torque is maximized for the armature current command value; and
a processor configured to:
detect, using a rotation angle sensor, the rotor rotation angle of the motor;
set, as a first setting portion, a motor torque command value that is a command value of the motor torque to be generated by the motor; and
set, as a second setting portion, based on the table, the armature current command value and the current phase angle command value for configuring the motor to generate the motor torque in accordance with the motor torque command value set by the first setting portion at the detected rotor rotation angle, wherein:
the table stored in the memory includes:
a first table in which a motor torque generated from the motor rotated in a first rotation direction is stored in the memory according to each detected rotor rotation angle with respect to the combination of the armature current command value and the current phase angle command value at which the motor torque is maximized for the armature current command value; and
a second table in which a motor torque generated from the motor rotated in a second rotation direction opposite to the first rotation direction is stored in the memory according to each detected rotor rotation angle with respect to a combination of the armature current command value and the current phase angle command value at which the motor torque is maximized for the armature current command value, and
the processor is configured to set, as the second setting portion, the armature current command value and the current phase angle command value for making the motor torque be generated from the motor that is in accordance with the motor torque command value at the detected rotor rotation angle based on the first table when a torque direction of the motor torque command value is the first rotation direction or based on the second table when the torque direction of the motor torque command value is the second rotation direction.

2. A motor control device that controls a reluctance torque utilizing a motor, the motor control device comprising:
a memory storing a table in which a plurality of motor torques each generated from the motor during operation is stored in the memory according to each detected rotor rotation angle of a plurality of rotor rotation angles of the motor with respect to a combination of an armature current command value and a current phase angle command value at which the motor torque is maximized for the armature current command value; and
a processor configured to:
detect, using a rotation angle sensor, the rotor rotation angle of the motor;
set, as a first setting portion, a motor torque command value that is a command value of the motor torque to be generated by the motor; and
set, as a second setting portion, based on the table, the armature current command value and the current phase angle command value for configuring the motor to generate the motor torque in accordance with the motor torque command value set by the first setting portion at the detected rotor rotation angle, wherein:
the memory further stores:
a torque fluctuation reducing table; and
a high output table that stores a combination of an armature current command value and a current phase angle command value that enables a maximum motor torque to be obtained according to each rotation speed of the motor, and
the processor is further configured to:
select, in the second setting portion, either the torque fluctuation reducing table or the high output table according to the rotation speed of the motor; and
set an armature current command value and a current phase angle command value using the selected torque fluctuation reducing table or the high output table.

3. The motor control device according to claim 1, wherein:
the motor is a reluctance torque utilizing motor that includes two systems of stator coils,
the motor torque generated from the motor is stored with respect to a combination of a comprehensive armature current command value that encompasses the two systems of stator coils and the current phase angle command value at which the motor torque is maximized for the comprehensive armature current command value is stored in the table,
the processor is further configured to:
distribute, in the second setting portion, the comprehensive armature current command value set based on the table between the two systems of stator coils, and
control currents supplied to the two systems of stator coils based on the armature current command values distributed according to the two systems of stator coils and the current phase angle command value set by the second setting portion.

4. The motor control device according to claim 1, wherein:
the motor control device controls a reluctance torque utilizing motor that includes two systems of stator coils,
the processor is configured to distribute, as a torque command value distributing portion, the motor torque command value set by the first setting portion between a first motor torque command value for a first system and a second motor torque command value for a second system, the table stored in the memory includes a first table for the first system and a second table for the second system, and the processor is further configured to, in the second setting portion:
  use, as a first system command value setting portion, the first table and the first motor torque command value for the first system to set the armature current command value and the current phase angle command value for the first system,
  use, as a second system command value setting portion, the second table and the second motor torque command value for the second system to set the armature current command value and the current phase angle command value for the second system,
  control a first current supplied to the stator coil of the first system based on the armature current command value and the current phase angle command value for the first system, and
  control a second current supplied to the stator coil of the second system based on the armature current command value and the current phase angle command value for the second system.

5. The motor control device according to claim 4, wherein:
the memory further includes a first system abnormal state table that is different than the second table for the second system and a second system abnormal state table that is different than the first table for the first system, and
the processor is further configured to:
  use, in the first system command value setting portion, the second system abnormal state table to set the armature current command value and the current phase angle command value for the first system when the second system is abnormal, and
  use, in the second system command value setting portion, the first system abnormal state table to set the armature current command value and the current phase angle command value for the second system when the first system is abnormal.

6. The motor control device according to claim 1, wherein:
the memory further stores:
  a torque fluctuation reducing table; and
  a high output table that stores a combination of an armature current command value and a current phase angle command value that enables a maximum motor torque to be obtained according to each rotation speed of the motor, and
the processor is further configured to:
  select, in the second setting portion, either the torque fluctuation reducing table or the high output table according to the rotation speed of the motor; and
  set an armature current command value and a current phase angle command value using the selected torque fluctuation reducing table or the high output table.

7. The motor control device according to claim 1, wherein:
the motor is a reluctance torque utilizing motor that includes two systems of stator coils,
the motor torque generated from the motor is stored with respect to a combination of a comprehensive armature current command value that encompasses the two systems of stator coils and the current phase angle command value at which the motor torque is maximized for the comprehensive armature current command value is stored in the table, and
the processor is further configured to:
  distribute, in the second setting portion, the comprehensive armature current command value set based on the table between the two systems of stator coils, and
  control currents supplied to the two systems of stator coils based on the armature current command values distributed according to the two systems of stator coils and the current phase angle command value set by the second setting portion.

8. The motor control device according to claim 1, wherein:
the motor control device controls a reluctance torque utilizing motor that includes two systems of stator coils,
the processor is configured to distribute, as a torque command value distributing portion, the motor torque command value set by the first setting portion between a first motor torque command value for a first system and a second motor torque command value for a second system,
the table stored in the memory includes a first table for the first system and a second table for the second system, and
the processor is further configured to, in the second setting portion:
  use, as a first system command value setting portion, the first table and the first motor torque command value for the first system to set the armature current command value and the current phase angle command value for the first system,
  use, as a second system command value setting portion, the second table and the second motor torque command value for the second system to set the armature current command value and the current phase angle command value for the second system,
  control a first current supplied to the stator coil of the first system based on the armature current command value and the current phase angle command value for the first system, and
  control a second current supplied to the stator coil of the second system based on the armature current command value and the current phase angle command value for the second system.

9. The motor control device according to claim 8, wherein:
the memory further includes a first system abnormal state table that is different than the second table for the second system and a second system abnormal state table that is different than the first table for the first system, and
the processor is further configured to:
  use, in the first system command value setting portion, the second system abnormal state table to set the armature current command value and the current phase angle command value for the first system when the second system is abnormal, and
  use, in the second system command value setting portion, the first system abnormal state table to set the armature current command value and the current phase angle command value for the second system when the first system is abnormal.

\* \* \* \* \*